United States Patent
Nyhart et al.

(10) Patent No.: US 12,169,245 B2
(45) Date of Patent: Dec. 17, 2024

(54) GPS SLOPE DETERMINATION

(71) Applicant: BUSHNELL INC., Overland Park, KS (US)

(72) Inventors: Scott Nyhart, Shawnee, KS (US); William Flood, Olathe, KS (US)

(73) Assignee: Bushnell Inc., Overland Park, KS (US)

( * ) Notice: Subject to any disclaimer, the term of this patent is extended or adjusted under 35 U.S.C. 154(b) by 325 days.

(21) Appl. No.: 17/835,760

(22) Filed: Jun. 8, 2022

(65) Prior Publication Data

US 2022/0390620 A1    Dec. 8, 2022

Related U.S. Application Data

(60) Provisional application No. 63/208,114, filed on Jun. 8, 2021.

(51) Int. Cl.
| | | |
|---|---|---|
| *G01S 19/45* | (2010.01) | |
| *A63B 57/00* | (2015.01) | |
| *G01S 19/19* | (2010.01) | |

(52) U.S. Cl.
CPC ............ *G01S 19/45* (2013.01); *A63B 57/505* (2015.10); *G01S 19/19* (2013.01); *A63B 2220/12* (2013.01);
(Continued)

(58) Field of Classification Search
CPC .............. A63B 57/505; A63B 2220/18; A63B 2220/12; G01S 19/45; G01S 19/19
(Continued)

(56) References Cited

U.S. PATENT DOCUMENTS

| | | |
|---|---|---|
| 5,797,809 A | 8/1998 | Hyuga |
| 7,121,962 B2 | 10/2006 | Reeves |

(Continued)

FOREIGN PATENT DOCUMENTS

| | | |
|---|---|---|
| CN | 105107168 A | 12/2015 |
| CN | 108348804 A | 7/2018 |

(Continued)

OTHER PUBLICATIONS

English Translation of First Office Action for corresponding Chinese Patent Application No. 202210648258.7, issued Feb. 21, 2024; 10 pgs.

(Continued)

*Primary Examiner* — Harry K Liu
(74) *Attorney, Agent, or Firm* — Reed Smith LLP; Walter M. Egbert, III; Richard J. Brown

(57) ABSTRACT

Disclosed are a device, computer program and method, for determining a range to a target, the device comprising a global positioning system (GPS) receiver, a pressure sensor, a temperature sensor, a controller; wherein the method comprises determining the device's geographic location based on coordinates from the GPS receiver and the device's elevation based on pressure and temperature data from the sensors; obtaining a location and elevation of a landmark based on GPS coordinates from a database; determining a distance between the device and the landmark using GPS coordinates; applying a slope compensation based on the difference in elevation between the device's elevation and the landmark; and converting the distance to a signal perceptible to a user.

20 Claims, 11 Drawing Sheets

(52) U.S. Cl.
CPC ....... *A63B 2220/18* (2013.01); *A63B 2220/72* (2013.01); *A63B 2220/73* (2013.01); *A63B 2220/74* (2013.01); *A63B 2225/50* (2013.01)

(58) Field of Classification Search
USPC .................................................. 342/357.28
See application file for complete search history.

(56) References Cited

U.S. PATENT DOCUMENTS

| | | | |
|---|---|---|---|
| 8,172,702 | B2 | 5/2012 | Meadows et al. |
| 8,444,149 | B2 | 5/2013 | Sweeney |
| 8,460,111 | B2 | 6/2013 | Hart |
| 8,556,752 | B2 | 10/2013 | Meadows et al. |
| 9,561,421 | B2 | 2/2017 | Hungelmann |
| 12,007,491 | B2 * | 6/2024 | Cole .................. G01S 19/45 |
| 2012/0071277 | A1 | 3/2012 | Denton et al. |
| 2014/0278220 | A1 | 9/2014 | Yuen |
| 2019/0094343 | A1 | 3/2019 | Nyhart et al. |
| 2022/0196401 | A1 * | 6/2022 | Wirola .................. G01C 5/06 |

FOREIGN PATENT DOCUMENTS

| | | | |
|---|---|---|---|
| KR | 20160134383 A | * | 11/2016 |
| TW | 200940128 A | | 10/2009 |

OTHER PUBLICATIONS

Translation of Office Action for corresponding Japanese Patent Application No. 2022-092956, issued Jul. 26, 2023.

Extended European Search Report of corresponding EPO Patent Application No. 22177946.5, dated May 12, 2022.

Golfpadgps: "What is Plays Like? Does Golf Pad use Plays Like distances?" May 12, 2021 XP055982113 https://web.archive.org/web/20210512053815/https:// support.golfpadgps.com/support/solutions/articles/6000236532-what-are-plays-like-distances-in-golf-pad-#expand.

Golfpadgps: "Golf Pad aerial maps features : Improve Your Golf Game" Apr. 16, 2021 XP055982165 https://web.archive.org/web/20210416235121/https:// support.golfpadgps.com/support/solutions/articles/6000143879- golf-pad-aerial-maps-features.

Golfpadgps: "What features are available on Samsung Galaxy/Gear? : Improve Your Golf Game" May 12, 2021 XP055982164 https://web.archive.org/web/20210512051546/https:// support.golfpadgps.com/support/solutions/articles/7318-what- features-are-available-on-samsung-galaxy-gear.

Golfpadgps: "Access GPS distances without unlocking the phone : Improve Your Golf Game. Golf Pad GPS Tutorials/FAQ" Apr. 17, 2021, XP055982163,https://web.archive.org/web/20210417002428/https:// support.golfpadgps.com/support/solutions/articles/6000194408- access-gps-distances-without-unlocking-the-phone.

Golfpadgps: "Golf Pad GPS + Samsung Watch on the course: Improve your golf game with detailed statistics." Sep. 26, 2020, XP055982700,https://www.youtube.com/watch?v=Ay6nd54JXAs&ab_channel=GolfPad.

Translation of Office Action for corresponding TW Application No. 111121168 dated, Jun. 16, 2023.

Translation of Notice of Allowance for corresponding TW Application No. 111121168, dated Oct. 25, 2023.

* cited by examiner

GPS SLOPE DETERMINATION

CROSS REFERENCE TO RELATED APPLICATIONS

This application claims the benefit of priority to U.S. Patent Application Ser. No. 63/208,114 filed Jun. 8, 2021, the entire contents of which are incorporated herein by reference.

FIELD OF THE DISCLOSURE

The present disclosure relates to a system, device, method and computer program for determining a range to a target.

BACKGROUND OF THE DISCLOSURE

Unlike sports such as baseball, tennis, soccer and football, the sport of golf does not use a standardized playing area. Accordingly, the player's ability to cope with the varied terrains encountered on different golf courses is an important part of game strategy. A golf course typically consists of either 9 or 18 holes with each hole having a cup surrounded by a putting green. A flagstick or "pin" is received in the cup making the location of the cup visible from a distance. Each hole also includes at least one teeing region or "tee box" that is set off with two markers showing the bounds of the legal tee area. Additional tee boxes may be included to allow players of different abilities to play the same hole. A fairway extends between the tee box and the cup.

A variety of obstacles and hazards are also typically placed between the tee box and the pin. These obstacles and hazards may including sand bunkers, trees, ponds, lakes, rivers, shoreline, creeks, un-grassed areas, and natural vegetation areas, which are typically located on the sides of fairways but may be placed in the fairways. Generally, the fairway is far from perfectly flat and may have significant undulations and changes in elevation. Sometimes the elevation differential between the golf ball striking location and the landing spot, such as the green, can be significant. Other environmental conditions, such as altitude, temperature, and wind direction and strength can affect the golf ball path, including distance. Knowing distances to the green and/or the pin, and to such hazards, and making the appropriate shot based on such distances is necessary to excel in the game of golf.

Golfers strive to shoot low golf scores, that is, going from tee to cup in a minimal number of strokes. Serious golfers need to know the distances that they hit each club in their bag; however, such distances presume level surfaces and ideal or typical weather conditions. Golfers always are making subjective judgements on accommodating different variables that they are subjected to including differing elevations from ball location to landing area, wind, and avoidance of hazards, all with the goal of shooting low scores.

Accomplished golfers consider many variables on each shot, especially shots to the green, and to the extent data and information is available through the electronic devices, such data and information are welcome. Such information and data can help golfers determine club selection, where to hit the ball, and even how to hit the ball.

A further consideration in golf is the pace of play. Maintaining a good pace of play is one of the main rules of golf etiquette. At times this is very important as a slow player or players can back up an entire course and disrupt scheduled tee times. Playing partners and groups behind slow players seriously frown upon slow play.

In recent decades, electronic rangefinder devices have been introduced for providing distance measurements to aid golfers. These rangefinders include laser rangefinders and rangefinder devices utilize the Global Positioning System (GPS). Such GPS rangefinder devices store golf course layouts and with the GPS-capable device establish the location of the rangefinder device with respect to the golf course. With the course layout stored in the GPS device, the device can calculate and display the distances to the middle, front, and rear of the green on the current hole as well as the distance to hazards. Distances can be graphically displayed on a display screen, such as an LCD display and/or an OLED display. The GPS rangefinder devices are also combinable with laser rangefinders providing more capabilities in determining accurate distances. Discrete GPS rangefinder devices, without a laser rangefinder, have become miniaturized to the extent that they can be worn as a watch or easily clipped to the golfer's apparel or to a golf bag.

Initially GPS devices were utilized solely for calculating distances by comparing the actual location of the GPS device to GPS coordinates of known locations, such as tee boxes, greens or hazards. Although that is clearly still their principle use today, it is desirable to equip GPS devices with additional functionalities.

SUMMARY OF THE DISCLOSED SUBJECT MATTER

An aspect of this disclosure is a device for determining distances, comprising a controller, a global positioning system (GPS) receiver, a pressure sensor; a temperature sensor in communication with the controller; and a non-transitory computer readable storage medium comprising a plurality of computer readable instructions embodied thereon which, when executed by the controller, causes the controller to determine an elevation offset factor by executing computer readable instructions to determine the device's geographic location based on first coordinates from the GPS receiver; obtain a reference location based on GPS coordinates and a reference elevation from a database; determine that the device's location matches the reference location by comparing the reference GPS coordinates to the first GPS coordinates from the GPS receiver; determine the device's pressure elevation based on pressure and temperature values received from the pressure sensor and the temperature sensor; compare the device's pressure elevation to the reference elevation; and determine the elevation offset factor based on the difference between the device's pressure elevation and the reference elevation.

Embodiments of the device include the following, alone or in any combination.

The device may be used to determine location and elevation information on a golf course, such as wherein the reference location is a tee box or a green.

The controller may be further configured to determine the device's current location based on current GPS coordinates from the GPS receiver; obtain a landmark location based on the landmark's GPS coordinates from a database; determine a distance between the device and the landmark using the current GPS coordinates and the landmark's GPS coordinates; and convert the distance to a signal perceptible to a user.

The landmark may be selected from the group consisting of green fronts, green centers, backs of greens, flagsticks, pin positions, cups, green perimeters, hazards, bunkers, traps, water features, roughs, fairway boundaries and cart paths.

The controller may be further configured to determine the device's current elevation based on pressure and temperature values received from the pressure sensor and the temperature sensor and applying the elevation offset factor, such as wherein the device's current location and elevation is determined at a current lie of a golf ball on a golf course.

The controller may be further configured to obtain the landmark's elevation from the database; determine shot information comprising a slope-compensated distance based on the landmark's location and elevation and the device's current location and elevation applied to a ballistic trajectory from the device's current location and elevation toward the landmark; and convert the shot information to a signal perceptible to a user.

Shot information may further comprise an elevation-compensating factor to the slope-compensated distance based on the effect of the device's current elevation on ballistic flight of a golf ball and/or a temperature-compensating factor to the slope-compensated distance based on the effect of current temperature on ballistic flight of a golf ball.

The temperature sensor may be remote from the device and temperature information is transmitted wirelessly to the controller.

Another aspect is a non-transitory computer readable storage medium comprising a plurality of computer readable instructions embodied thereon wherein the instructions, when executed by a controller of a device described above causes the controller to determine an elevation offset factor by executing computer readable instructions to determine the device's geographic location based on first coordinates from the GPS receiver; obtain a reference location based on GPS coordinates and a reference elevation from a database; determine that the device's location matches the reference location by comparing the reference GPS coordinates to the first GPS coordinates from the GPS receiver; determine the device's pressure elevation based on pressure and temperature values received from the pressure sensor and the temperature sensor; compare the device's pressure elevation to the reference elevation; and determine the elevation offset factor based on the difference between the device's pressure and the reference elevation.

Embodiments of this aspect include the following, alone or in any combination.

The instructions may further cause the controller to determine the device's current location based on current GPS coordinates from the GPS receiver; obtain a landmark location based on the landmark's GPS coordinates from a database; determine a distance between the device and the landmark using the current GPS coordinates and the landmark's GPS coordinates; and convert the distance to a signal perceptible to a user.

The instructions may further cause the controller to determine the device's elevation based on pressure and temperature values received from the pressure sensor and the temperature sensor; and apply the elevation offset factor.

The instructions may further cause the controller to further cause the controller to obtain the landmark's elevation from the database; determine shot information comprising a slope-compensated distance based on the landmark's location and elevation and the device's current location and elevation applied to a ballistic trajectory from the device's current location and elevation toward the landmark; and convert the shot information to a signal perceptible to a user.

The instructions may further cause the controller to determine an elevation-compensating factor based on the effect of the device's current elevation on ballistic flight of a golf ball and apply it to the slope-compensated distance.

The instructions may further cause the controller to determine a temperature-compensating factor based on the effect of the current temperature on ballistic flight of a golf ball and apply it to the slope-compensated distance.

Another aspect is a method for determining distances executed by a controller on a device described above, the method comprising the controller determining an elevation offset factor by determining the device's geographic location based on first coordinates from the GPS receiver; obtaining a reference location based on GPS coordinates and a reference elevation from a database; determining that the device's location matches the reference location by comparing the reference GPS coordinates to the first GPS coordinates from the GPS receiver; determining the device's pressure elevation based on pressure and temperature values received from the pressure sensor and the temperature sensor; comparing the device's pressure elevation to the reference elevation; and determining the elevation offset factor based on the difference between the device's pressure and the reference elevation.

Embodiments of the method include the following, alone or in any combination.

The controller further determining the device's current location based on current GPS coordinates from the GPS receiver; obtaining a landmark location based on the landmark's GPS coordinates from a database; determining a distance between the device and the landmark using the current GPS coordinates and the landmark's GPS coordinates; and converting the distance to a signal perceptible to a user.

The controller further determining the device's elevation based on pressure and temperature values received from the pressure sensor and the temperature sensor; and applying the elevation offset factor.

The controller further obtaining the landmark's elevation from the database; determining shot information comprising a slope-compensated distance based on the landmark's location and elevation and the device's current location and elevation applied to a ballistic trajectory from the device's current location and elevation toward the landmark; and converting the shot information to a signal perceptible to a user.

The controller further determining an elevation-compensating factor based on the effect of the current elevation on ballistic flight of a golf ball and applying it to the slope-compensated distance and/or further determining a temperature-compensating factor based on the effect of the current temperature on ballistic flight of a golf ball and applying it to the slope-compensated distance.

BRIEF DESCRIPTION OF THE DRAWINGS

The disclosed aspects described herein in conjunction with the appended drawings are provided to illustrate and not to limit the disclosed aspects, wherein like designations denote like elements.

DETAILED DESCRIPTION THE DISCLOSED SUBJECT MATTER

It is often desirable to determine accurate ranges to targets in various situations. For example, golfers utilize a range to a target, such as a range to a green or a pin positioned on the green, in determining club selection. Conventional GPS devices have been developed to determine ranges to targets. However, these conventional devices determine ranges which only represent a straight-line distance to a target and which fail to account for the ballistic trajectory of projectiles, such as a golf ball, intended for the target. A ballistic trajectory is generally parabolic, wherein the influence of gravity and air resistance result in the descent angle being steeper than the launch angle. As a result, these conventional devices generate inaccurate results if a target is positioned above or below the device. For instance, if a target is positioned above a device, a projectile originating at the location of the device, such as a struck golf ball, must be struck to travel a greater distance to reach the target than if the target was not positioned above the device due to the ballistic trajectory of the golf ball. Similarly, if a target is positioned below a device, a projectile originating at the device must be struck to travel a lesser distance to intersect the target than if the target was not positioned below the device. Conventional GPS devices are unable to account for this increase or decrease in distance to a target caused by the trajectory of the projectile and the angle to the target.

As individuals often determine ranges to targets while outdoors on terrains of varying slopes, such as a golfer on a golf course, the inaccurate results generated by conventional range determining devices substantially inhibit the use of the devices and negate many beneficial aspects of the devices. For instance, a golfer is unlikely to utilize a rangefinding device that provides inaccurate yardage measurements over sloping terrain and thus is forced to use multiple devices to determine a single accurate range or manually estimate or guess at the correct yardage based on the determined range. Such use of estimations and multiple devices results in undesirable inconvenience and inaccuracy.

Accordingly, golfers are more interested in actual distance and slope than GPS-determined distances. A golf ball will play longer or shorter than actual distance based on slope. Slope is the % grade created by the ratio of elevation change divided by the horizontal distance between two points. Actual Distance (AD) can be calculated as the SquareRoot of (Horizontal Distance (HD)^2+elevation_difference^2. However, this calculation does not determine the slope between the two points. Typically, GPS devices do not provide elevation information that would allow for determining the elevation difference.

Figure 1:
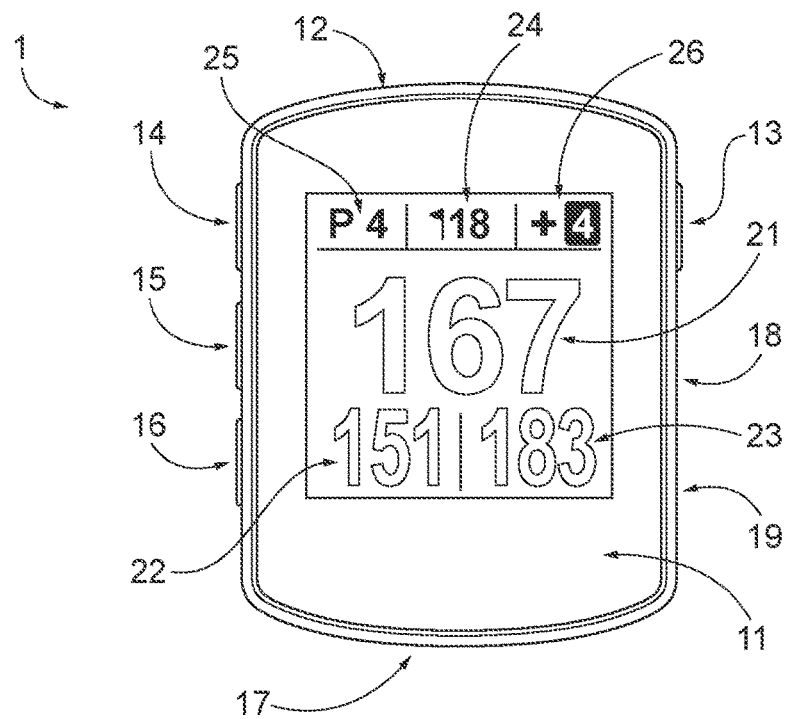
FIG. 1 depicts a front face of a device according to an exemplary embodiment of the disclosed subject matter.

FIG. 1 shows a front view of a device 1 according to an exemplary embodiment. The device 1 comprises a planar and generally rectangular front face having rounded corners, the front face with a display screen 11, a housing 12 having a top face, a bottom face and two lateral side faces that are generally rectangular with rounded corners, and a generally rectangular-shaped rearward face with rounded corners and optionally a central projection.

Figure 3:
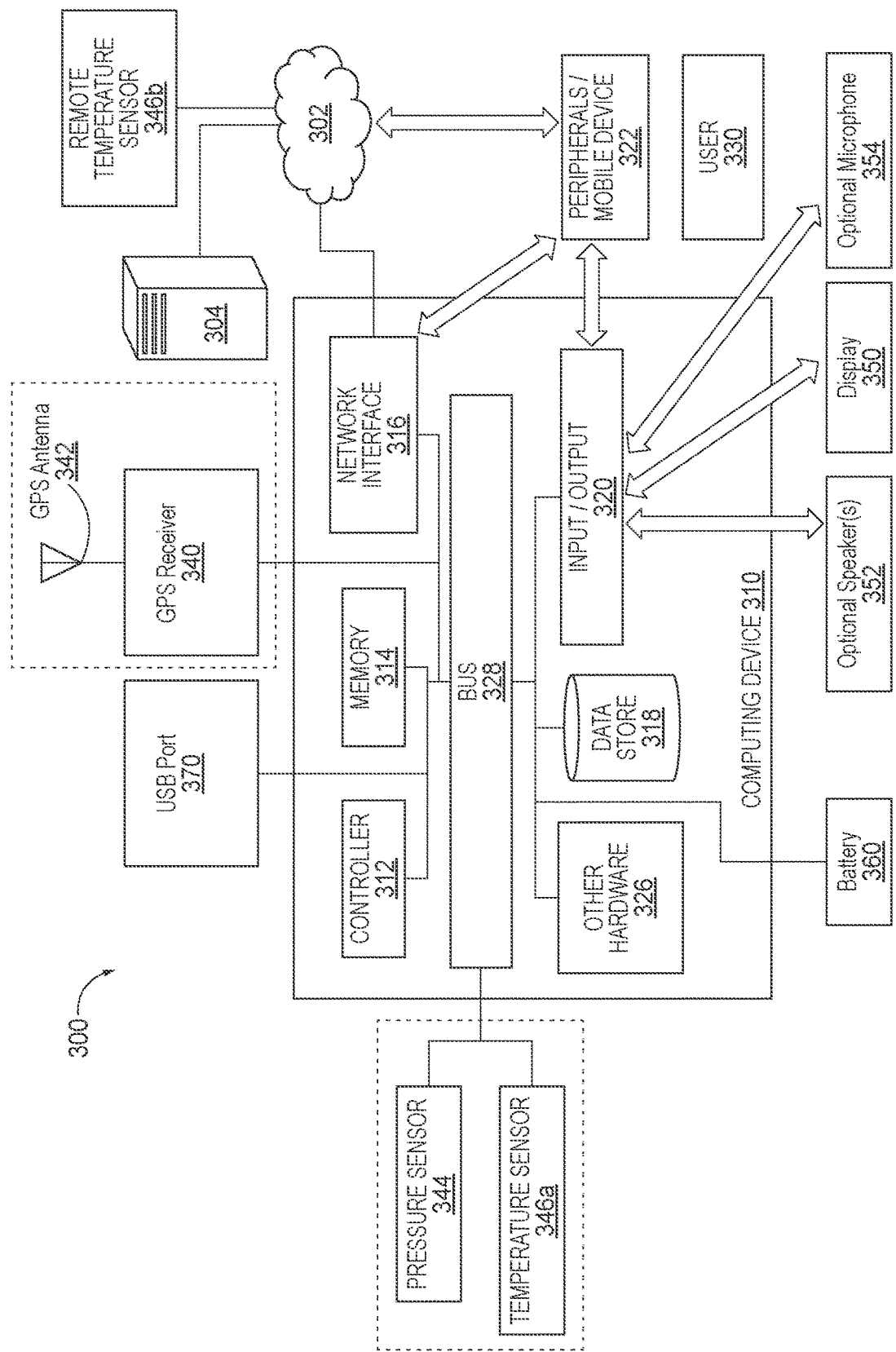
FIG. 3 depicts a block diagram of a device according to an exemplary embodiment of the disclosed subject matter.

The two lateral side faces comprise a plurality of control buttons. Power/menu button 13 is used to turn on the device and switch between menus. Pressing and holding button 13 turns the device on and off. When turned on, a home screen appears. When powered up, pressing the button switches among menus including a settings menu, golf mode menu, etc. In golf mode, pressing button 13 provides for score entry. Up button 14 scrolls up through a menu screen or list. Select button 15 cycles screens in play golf mode and selects menu options. Down button 16 scrolls down through a menu screen. A USB (type C) port 17 is located on the bottom face and is configured to connect to a charger unit for recharging an internal battery or to another electronic device. External components for pressure sensor 344 and temperature sensor 346a (see FIG. 3) are located on one of the lateral side faces, such as at 18 and 19. Optionally, speaker(s) and a microphone may be disposed in the bottom face of the device 1.

The display screen 11 is positioned to be viewable at the front face of the device 1 within the bezel and user controls on the housing 12. In the embodiment shown in FIG. 1, the display 11 is showing the Front, Center, Back (FCB) screen. The distance to the center of the green is shown at 21, the distance to the front of the green is shown at 22 and the distance to the rear of the green is shown at 23. The current hole number is shown at 24. Par for the current hole is shown at 25 and the golfer's current total score for the round is shown at 26.

The circuitry, including a GPS receiver, a processor, memory, connection to a battery, are all positioned in the interior of the housing 12, and the circuitry is further connected to the display screen 11.

Such an arrangement provides an elegantly simple design that keeps manufacturing costs low with the simple design, for example a simple clam-shell configuration.

A feature and advantage of embodiments is the combination of optimal size for handling and reading the display, while still being easily portable and/or wearable, and while still being lightweight.

In embodiments, the device 1 has a greatest height or width dimension of less than 6 inches. In embodiments, the device has a rectangular appearance with rounded corners and optionally curved top and bottom faces when viewing the display. In embodiments, the display side 11 of the device 1, as defined by its housing 12, may have a width of less than 2.6 inches and a height of less than 6 inches. In embodiments, the display side 11 of the device 1, as defined by its housing 12, may have a width of less than 2.3 inches and a height of less than 5 inches. In embodiments, the device 1, as defined by its housing, has a maximum depth of 0.95 inches. In embodiments, the device 1, as defined by its housing, has a maximum depth of 0.80 inches.

In embodiments, a feature and advantage is that each exterior corner of the housing 12 of the device 1 is rounded and has a radius of 0.12 inches or greater. In embodiments, a feature and advantage is that each exterior corner of the housing of the device is rounded with a radius of 0.10 inches or greater.

A feature and advantage of embodiments is that the GPS device 1 has a planar front face where the display screen 11 is located and a subtly projecting rear face such that a user when grasping the device, without looking at the device, can ascertain which side is the forward side and which side is the rearward side, minimizing the manipulation to raise the device to a use and viewing position. A feature and advantage may be that each of four side walls are inclined inwardly from the front side to the rear side allowing a larger front side where the display 11 is positioned compared to the rearward side. Such a configuration accommodates the internal arrangement of components. For example a printed circuit board assembly (PCBA) with display screen 11 attached thereto is positioned forwardly at the front wall portion and has the largest area to be accommodated forwardly at the front wall portion and positioned behind the display screen, and a battery is positioned behind the PCBA. Thus, an optimal miniaturization may have a housing with a front to rearward taper.

Optionally, a portion of the housing 12 is utilized to provide an interface for an optional magnet (not shown), the portion of the housing having an exterior surface with no recesses and no concavities. The portion of the housing may be the entire rearward face, or a portion thereof, of the device with a display screen on the forward face. The optional magnet may be positioned in an interior of the housing 12 at a central projection at the rear of the device 1, the housing having an exterior planar surface at the magnet, the exterior planar surface conforming in size to the magnet. In embodiments, the rearward side has a projection that extends rearwardly at least 0.06 inches and less than 0.25 inches.

In embodiments, the light weight of the device may allow for the use of a high integrity magnetic securement using the optional magnet for attaching directly to a metal post or component of a golf cart as well as to an accessory clip that is then attached to a golf bag or user's apparel. For example, due to the device's light weight, for example less than about 3 ounces, bumps are less likely to disengage the magnet from the metal post or accessory clip as compared to a device with a greater weight. Additionally, size and weight are optimal for easy pocketing and removal.

More particularly, this disclosure relates to a system, device, method and computer program for determining a second range to a target based on a first range and an angle to the target such that the ballistic trajectory of a projectile is accounted for in determining the second range.

Figure 2A:
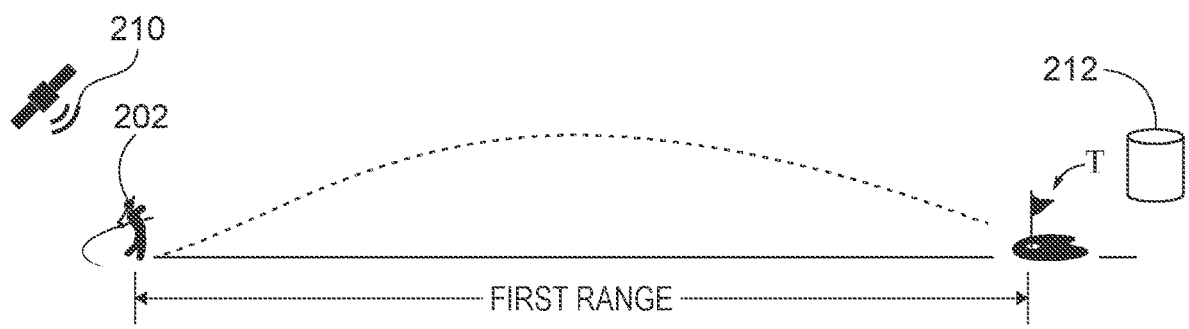
FIGS. 2A-C depict aspects of determining a second range to a target based on a first range and an angle to the target such that the ballistic trajectory of a projectile is accounted for in determining the second range, according to an exemplary embodiment of the disclosed subject matter.
Figure 2B:
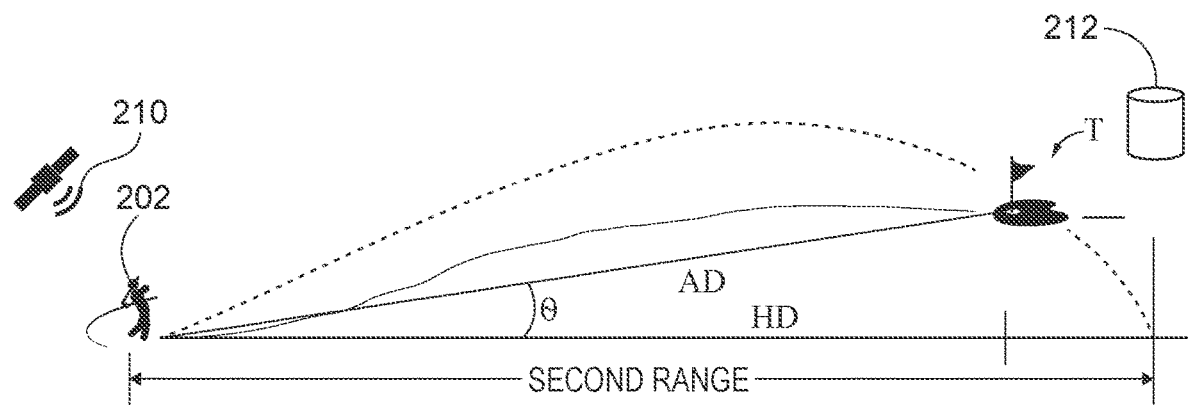
Figure 2C:
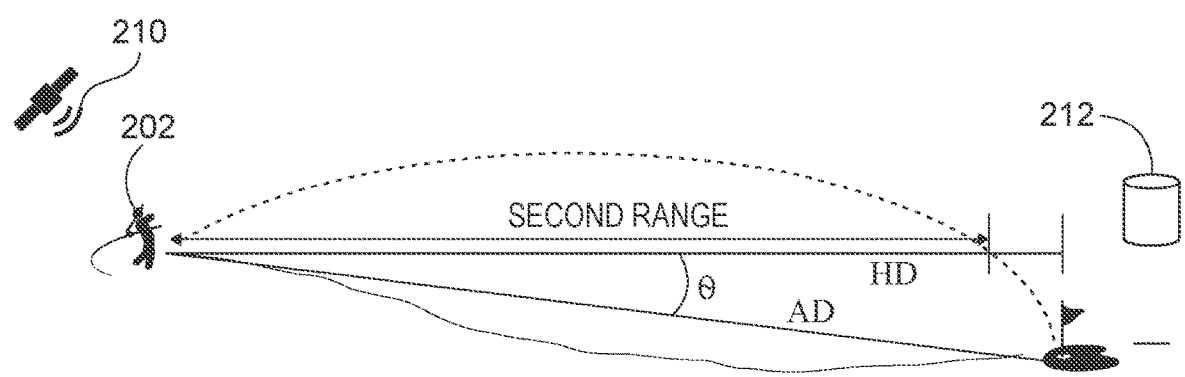

Referring to FIGS. 2A-C, the device described herein is operable to determine the angle θ to the target T from the device carried by golfer 202 relative to a horizontal plane at the level of the golfer. The horizontal distance (HD) is the distance determined by finding the distance between the device's location and the target using GPS coordinates. The device's location can be determined in real time by the device obtaining its location GPS coordinates from at least one GPS satellite 210. Typically a GPS receiver requires a minimum of 3 satellites to determine its location. The GPS coordinates of target T can be obtained from a data store 212 storing its previously determined GPS coordinates. As shown in FIG. 2A, if the device and the target T are both positioned on a flat surface having no slope, the angle θ would be zero and the actual distance AD would be the same as the horizontal distance as indicated by the First Range. If the device is positioned below the target T, as shown in FIG. 2B, the slope between the device and the target T is positive and the angle θ would be positive (that is, the slope is uphill between the location of the device and the target T) and the actual distance is different from the horizontal distance. Conversely, as shown in FIG. 2C, if the device is positioned above the target T, such that the slope between the device and the target T is negative or downhill, the angle θ would be negative. It may be appreciated that the angle θ is not dependent on the specific contours of the ground or surfaces between the device and the target T, but rather the angle θ is preferably determined based on the change of elevation between the device and the target T, as described below.

In situations where the angle θ is non-zero, such as when the target T is positioned above or below the device 1, the ballistic movement of a projectile (e.g. golf ball) affects the range calculation, such that the projectile may have to travel a longer or shorter distance to reach the target T. The factor adjusts the first range to account for the longer or shorter distance the golf ball must travel to reach the target T due to the angle θ such that the second range is an accurate representation to the user of the flat-ground distance the projectile should travel to intersect the target T.

For example, as shown in FIG. 2B, a first range may be 100 yards, which represents a horizontal distance to a target, but with an angle θ of three degrees, a second range will be 104 yards, as determined by a calculation described below in detail. The second range of 104 yards represents the flat-ground range the projectile should travel such that its trajectory intersects the target at a position, as shown in FIG. 2B. Thus, the second range does not represent the actual straight-line distance to the target because it includes the larger or smaller distance the projectile must travel to intersect with target T. For instance, if a user is 100 yards away from a target and desires to hit a golf ball at the target, the user would attempt to strike the golf ball 100 yards. On flat ground, no additional computation is needed and a golf ball struck to travel 100 yards will reach the target. However, on non-flat ground, such as when the angle θ is three degrees for example, if the user strikes the golf ball to travel 100 yards as if on flat ground, the golf ball will fall short of the target due to the ballistic trajectory of the golf ball. In contrast, if the user strikes the golf ball to reach the second range, 104 yards as if on flat ground for example, the golf ball will not fall short of the target as the trajectory of the golf ball will intersect with the target due to the increased distance accounted for by the second range.

In FIG. 2C, where the slope is downhill, the second range would be shorter. The magnitudes of the horizontal distance HD, actual distance AD and angle θ are identical to those shown in FIG. 2B. However, the ballistic path of a golf ball that would land at the target T intersects the horizontal plane short of the horizontal distance HD.

The device is constructed in accordance with a preferred embodiment of the present disclosure. Broadly, the device includes a GPS receiver for determining a location of the GPS device on a golf course; a pressure sensor for determining atmospheric pressure at a reference point of known elevation and a current location of the GPS device; and a computing element coupled with the GPS receiver to determine a first range or distance to a target T, and coupled to the pressure sensor to determine the elevation of the current location of the GPS device based on a pressure difference between the reference point and the current location and further determine an angle θ based on the elevation of the current location of the GPS device and the elevation of target T, and determine a second range to the target T based on the first range and the determined angle θ; a memory for storing data such as a computer program to control the functionality of the device; and a portable handheld housing for housing the GPS receiver, the pressure sensor, the computing element, the memory, and other components described below.

FIG. 3A depicts a computer system 300 according to one aspect of the present disclosure. In general, the computer system 300 may include a computing device 310, such as a special-purpose computer designed and implemented for receiving sensor information, determining elevations and distances and directing and controlling the output of signals. The computing device 310 may be or include data sources, client devices, and so forth. For example, the computing device 310 may include a microprocessor installed and disposed within an internal area of a mobile device. In certain aspects, the computing device 310 may be implemented using hardware or a combination of software and hardware. The computing device 310 may be a standalone device, a device integrated into another entity or device, a platform distributed across multiple entities, or a virtualized device executing in a virtualization environment. According to one aspect, the computing device 310 may be a mobile device, such as a standalone device, mobile phone, tablet, phablet, PC or the like. According to another aspect, the computing device 310 may be a device further comprising a speaker.

The computing device 310 may communicate across a network 302. The network 302 may include any data network(s) or internetwork(s) suitable for communicating data and control information among participants in the computer system 300. This may include public networks such as the Internet, private networks, and telecommunications networks such as the Public Switched Telephone Network or cellular networks using cellular technology and/or other technologies, as well as any of a variety other local area networks or enterprise networks, along with any switches, routers, hubs, gateways, and the like that might be used to carry data among participants in the computer system 300. The network 302 may also include a combination of data networks and need not be limited to a strictly public or private network.

The computing device 310 may communicate with an external device 304. The external device 304 may be any computer, mobile device such as a cell phone, tablet, smart watch or other remote resource that connects to the computing device 310 through the network 302. This may include any of the servers or data sources described herein, including servers, content providers, databases or other sources for information to be used by the devices as described herein.

In general, the computing device 310 may include a controller 312, a memory 314, a network interface 316, a data store 318, and one or more input/output interfaces 320. The computing device 310 may further include or be in communication with peripherals 322 and other external input/output devices that might connect to the input/output interfaces 320.

The controller 312 may be implemented in software, hardware or a combination of software and hardware. According to one aspect, the controller 312 may be implemented in application software running on a mobile device. Alternatively, the controller 312 may include a processor or other processing circuitry capable of processing instructions for execution within the computing device 310 or computer system 300. The controller 312, as hardware, may include a single-threaded processor, a multi-threaded processor, a multi-core processor and so forth. The controller 312 may be capable of processing instructions stored in the memory 314 or the data store 318.

The memory 314 may store information within the computing device 310. The memory 314 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 314 may store program instructions, program data, executables, and other software and data useful for controlling operation of the computing device 310 and configuring the computing device 310 to perform functions for a user. The memory 314 may include a number of different stages and types of memory for different aspects of operation of the computing device 310. For example, a processor may include on-board memory and/or cache for faster access to certain data or instructions, and a separate, main memory or the like may be included to expand memory capacity as desired. All such memory types may be a part of the memory 314 as contemplated herein.

The memory 314 may, in general, include a non-volatile computer readable medium containing computer code that, when executed by the computing device 310 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 314 is depicted, it will be understood that any number of memories may be usefully incorporated into the computing device 310.

The network interface 316 may include any hardware and/or software for connecting the computing device 310 in a communicating relationship with other resources through the network 302. This may include remote resources accessible through the Internet (e.g. audio streaming, weather information), as well as local resources available using short range communications protocols using, e.g., physical connections (e.g., Ethernet), radio frequency communications (e.g., Wi-Fi, Bluetooth), optical communications (e.g., fiber optics, infrared, or the like), ultrasonic communications, or any combination of these or other media that might be used to carry data between the computing device 310 and other devices. The network interface 316 may, for example, include a router, a modem, a network card, an infrared transceiver, a radio frequency (RF) transceiver for receiving AM/FM or satellite radio sources, a near field communications interface, a radio-frequency identification (RFID) tag reader, or any other data reading or writing resource or the like.

The network interface 316 may include any combination of hardware and software suitable for coupling the components of the computing device 310 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 302 such as the Internet. This may also include hardware/software for a WiMax connection or a cellular network connection (using, e.g., CDMA, GSM, LTE, or any other suitable protocol or combination of protocols). The network interface 316 may be included as part of the input/output devices 320 or vice-versa.

The data store 318 may be any internal memory store providing a computer-readable medium such as a disk drive, an optical drive, a magnetic drive, a flash drive, or other device capable of providing mass storage for the computing device 310. The data store 318 may store computer readable instructions, data structures, program modules, and other data for the computing device 310 or computer system 300 in a non-volatile form for relatively long-term, persistent storage and subsequent retrieval and use. For example, the data store 318 may store an operating system, application programs, program data, databases, files, and other program modules or other software objects and the like.

In particular, memory 314 or data store 318 stores information about one or a plurality of golf courses including location and elevation information of golf course landmarks as described further herein.

The input/output interface 320 may support input from and output to other devices that might couple to the computing device 310. This may include, for example, serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also include an infrared interface, RF interface, magnetic card reader, or other input/output system for wirelessly coupling in a communicating relationship with other local devices. It will be understood that, while the network interface 316 for network communications is described separately from the input/output interface 320 for local device communications, these two interfaces may be the same, or may share functionality, such as where a USB port 370 is used to attach to a Wi-Fi accessory, or where an Ethernet connection is used to couple to a local network attached storage. The input/output interface 320 may further output signals to the display of the GPS device, as described herein.

In certain embodiments, the I/O interface 320 facilitates communication with input and output devices for interacting with a user. For example, the I/O interface may communicate with one or more devices such as a user-input device and/or a display 350, which may be instantiated on the device described herein and/or on a separate device such as a mobile device 208, which enable a user to interact directly with the controller 312 via bus 328. In these embodiments, the computer system may further comprise a display 350 to provide visual output to the user. The user-input device may comprise one or more push-buttons, a touch screen, or other devices that allows a user to input information. The display 350 may comprise any of a variety of visual displays, such as a viewable screen, a set of viewable symbols or numbers, and so on.

A peripheral 322 may include any device used to provide information to or receive information from the computing device 310. This may include human input/output (I/O) devices such as a keyboard, a mouse, a mouse pad, a track ball, a joystick, a microphone, a foot pedal, a camera, a touch screen, a scanner, or other device that may be employed by the user 330 to provide input to the computing device 310. This may also or instead include a display, a printer, a projector, a headset or any other audiovisual device for presenting information to a user. The peripheral 322 may also or instead include a digital signal processing device, an actuator, or other device to support control of or communication with other devices or components. In one aspect, the peripheral 322 may serve as the network interface 316, such as with a USB device configured to provide communications via short range (e.g., Bluetooth, Wi-Fi, Infrared, RF, or the like) or long range (e.g., cellular data or WiMax) communications protocols. In another aspect, the peripheral 322 may augment operation of the computing device 310 with additional functions or features, such as a GPS device, or other device. In another aspect, the peripheral 322 may include a storage device such as a flash card, USB drive, or other solid-state device, or an optical drive, a magnetic drive, a disk drive, or other device or combination of devices suitable for bulk storage. More generally, any device or combination of devices suitable for use with the computing device 310 may be used as a peripheral 322 as contemplated herein.

Other hardware 326 may be incorporated into the computing device 310 such as a co-processor, a digital signal processing system, a math co-processor, a graphics engine, a video driver, a camera, a microphone, additional speakers, and so forth. The other hardware 326 may also or instead include expanded input/output ports, extra memory, additional drives, and so forth.

A bus 328 or combination of busses may serve as an electromechanical backbone for interconnecting components of the computing device 310 such as the controller 312, memory 314, network interface 316, other hardware 326, data store 318, and input/output interface. As shown in the figure, each of the components of the computing device 310 may be interconnected using a system bus 328 in a communicating relationship for sharing controls, commands, data, power, and so forth.

The GPS receiver 340 comprises GPS functionality or another location service in an installed application. A GPS antenna 342 enables the device to obtain location information from at least one GPS satellite 210. A power source (not shown) may provide energy to the GPS device. The power source may be any power source such as a rechargeable battery 360 and a connecter for recharging the device.

In embodiments, the GPS device may include a digital compass and a current device direction is determined by the processor using signals from the digital compass.

The GPS device comprises an integral pressure sensor 344 configured to determine air pressure ambient to the device and provide signals to the processor conveying pressure information.

The GPS device may comprise a temperature sensor 346a configured to determine temperature ambient to the device and provide signals to the processor conveying temperature information. In addition to temperature information from temperature sensor 346a, the processor may preferably receive temperature information from a remote temperature sensor 346b in an external device, service, or network and communicated to the computing device 310 via network interface 316.

The GPS device also includes circuitry operatively coupled to a display 350 configured to provide visual information to a user. The GPS device optionally also includes circuitry operatively coupled to optional speakers 352 configured to provide audio information to a user. The GPS device also includes circuitry operatively coupled to a battery 360 configured to provide visual information to a user.

In embodiments, the circuitry comprises one or more processors and a non-transitory computer readable medium storing one or more instruction sets. In embodiments, the one or more instruction sets include instructions configured to be executed by the one or more processors to cause the GPS device to determine a "Play As" distance based on changes in elevation between its location and a location of a target T, using a "Slope" function as described herein.

The device or system for determining distances is described generally herein as a standalone, unitary device comprising a controller, a global positioning system (GPS) receiver, a pressure sensor, a temperature sensor in communication with the controller, a controller; and a non-transitory computer readable storage medium comprising a plurality of computer readable instructions embodied thereon. However, this is not limiting. In some embodiments, the hardware, software and sensors may be instantiated on more than one physical device. For example, the device may be in wireless connection with an app that is loaded onto a mobile device such as a mobile phone, tablet, phablet, smart watch, etc. that can perform a portion of the functions described herein such as connectivity to the internet or storage of information related to GPS positions of features of a golf course.

Embodiments include a system for determining distances, the system comprising a controller; a device comprising a global positioning system (GPS) receiver and a pressure sensor in communication with the controller; a temperature sensor in communication with the controller; and a non-transitory computer readable storage medium comprising a plurality of computer readable instructions embodied thereon which, when executed by the controller, causes the controller to: determine the device's geographic location based on first coordinates from the GPS receiver; obtain a landmark location based on second GPS coordinates from a database; determine a distance between the device and the landmark using the first and second GPS coordinates; and convert the distance to a signal perceptible to a user.

Embodiments include a system for determining distances, the system comprising a controller; a device comprising a global positioning system (GPS) receiver and a pressure sensor in communication with the controller; a temperature sensor in communication with the controller; and a non-transitory computer readable storage medium comprising a plurality of computer readable instructions embodied thereon which, when executed by the controller, causes the controller to: determine the device's geographic location based on first coordinates from the GPS receiver; obtain a landmark location based on second GPS coordinates from a database; determine a distance between the device and the landmark using the first and second GPS coordinates; determine the device's elevation based on pressure and temperature values received from the pressure sensor and the temperature sensor using an algorithm; obtain the landmark's elevation from the database; determine an elevation-compensated distance between the device and the landmark; and convert the elevation-compensated distance to a signal perceptible to the user.

Notably, the pressure and temperature sensors are two distinct sensors with different impact on the elevation performance. The elevation calculation is more sensitive to air pressure than temperature at the location of the device. It may be appreciated that the temperature difference due to small elevation changes throughout a golf course is minimal. So in the elevation equation described herein, temperature has less of an impact on the elevation than the pressure. Moreover, for a temperature sensor in a small portable device, the measured temperature can vary widely due to solar loading, and human body warming. Those swings can be significant such that it could introduce errors in the elevation equation. In situations where there are large solar or near-body temperature changes, it may be better to use a more constant temperature value that is not subject to these influences. In those situations, the temperature value from a weather service or a clubhouse thermometer could provide a temperature value that would result in a more true elevation result. Conversely, air pressure measured by a pressure sensor proximate to a user is less sensitive to influence by the user but has a greater impact on the elevation calculation such that the pressure sensor should be as close to the location where the elevation is desired to be determined. In short, pressure has to be measured at the user's location, but temperature could either be measured by the device using a temperature sensor 346a physically in the device or come from temperature sensor 346b remote from the device and associated with a web based weather service or a web-connected thermometer located, for example. at the clubhouse of the golf course.

Accordingly, when the device has network access, either directly or via communication with a mobile device, the device preferably may use temperature data obtained from a remote temperature sensor 346b located at a data service that is closest to the device's location, such as from a temperature sensor of a local weather station located at the golf course, or other data service with temperature information available and communicated to the controller.

The GPS receiver also needs to be located on a device carried by the user, such as device 1, because of its influence on the location determination.

In embodiments, the software and computer readable instructions required to perform the calculations and convert distance information to a signal perceptible to a user as described herein may be instantiated on an app that is loaded onto a mobile device such as a mobile phone, tablet, phablet, smart watch, etc., that includes all hardware components and functionality needed to perform the operations instantiated in the software, including network interface 316, display 350 and speaker(s) 352, wherein controller(s) and processor(s) on the mobile device executes the computer readable instructions and the temperature and pressure sensors and GPS capability are instantiated on one or more devices in wireless communication with the aforementioned mobile device.

In embodiments, when the device has network access, either directly or via communication with a mobile device, the device may access up-to-date golf course information from data stored on a remote server.

In a preferred embodiment the pressure sensor would be on a device described herein such as the device 1 shown in FIG. 1 or a wrist "watch." The device or watch would be physically with the golfer and use the app on the mobile device as a gateway to the internet.

In embodiments, the system may use display capabilities on the mobile device to display the distance and elevation information described herein.

In embodiments, the pressure sensor 344, temperature sensor 346a and optionally the GPS antenna and/or receiver may be instantiated on a small device such as a fob, beacon or wrist device carried or worn by a user that is in wireless communication with another physical device comprising the controller, processor(s), memory, display functions, etc. For example, a small device comprising the pressure sensor 344, temperature sensor 346a and GPS antenna 342 and/or receiver 340 (outlined by the dashed boxes in FIG. 3) may be in wireless communication with the computing device 310, including the components therein, physically located on a device such as device 1, or a mobile device such as a mobile phone, that also includes display 350 and optional speakers 352.

Alternatively, the fob, beacon or wrist device may comprise the pressure sensor 344 and temperature sensor 346a and wirelessly communicate pressure and temperature data to a device 1 or a mobile device such as a mobile phone that includes GPS functionality, and comprising the software application stored therein.

In another alternative embodiment, the small device or beacon may comprise the pressure sensor 344, temperature sensor 346a, GPS antenna 342 and speaker 352 in wireless communication with the computing device 310 to transmit sensor information to a device 1, receive distance information from device 1 and provide distance information to user 330 via the speaker. The beacon may further comprise a microphone 354 to allow the user 330 to provide verbal instructions to the device and/or one or more sensors to allow user 330 to provide tap signal(s) such as a request for distance information. In embodiments, the beacon may be configured as an earpiece such as an earbud, such as described in "Location-enabled Portable Audio System," U.S. patent application Ser. No. 16/935,929, incorporated herein by reference.

The device and computer program illustrated and described herein are merely examples of a device, system and a program that may be used to implement aspects of the present disclosure and may be replaced with other devices and programs without departing from the scope of the present disclosure.

The computing element may comprise a conventional microprocessor, microcontroller, or other electrical element or combination of elements, such as a single integrated circuit housed in a single package, multiple integrated circuits housed in single or multiple packages, or any other combination. Similarly, the computing element may be any element that is operable to determine the second range from the first range and angle θ as described below. Thus, the computing element is not limited to conventional microprocessor or microcontroller elements and may include any element that is operable to perform the functions described below.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

The computer program controls input and operation of the device. The computer program includes at least one code segment stored in or on a computer-readable medium residing on or accessible by the device for instructing the GPS receiver, pressure sensor, temperature sensor, computing element, and any other related components to operate in the manner described herein. The computer program is preferably stored within the memory and comprises an ordered listing of executable instructions for implementing logical functions in the device. However, the computer program may comprise programs and methods for implementing functions in the device that are not an ordered listing, such as hard-wired electronic components, programmable logic such as field-programmable gate arrays (FPGAs), application specific integrated circuits, or other similar or conventional methods for controlling the operation of electrical or other computing devices.

Similarly, the computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. The computer-readable medium may even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Memory can be used to store a map database comprising a computer readable map for one or more golf courses. The computer readable map(s) may be loaded into the device memory by the manufacturer. Alternatively, the computer readable golf course map may be loaded into memory by a user at the time of play by accessing a computer readable map provided by the golf course operator or from an internet or cloud-based server. In some embodiments, the device may be configured with communication units and computer readable instructions to enable a processor or controller on the device to access a computer readable map stored at a remote location, such as a remote server, a cloud-based application or a peripheral or mobile device in communication with the processor.

The computer readable map has actual (true) elevation information and GPS coordinates for one or more of tee boxes, front, center and/or back of greens, green perimeters and hazards such as bunkers, traps, water features, etc. that are based on measurements that are not dependent on localized weather conditions. The map database may also have elevations for a set number of points down the center of fairway that correspond with specific distances. In some embodiments, the computer readable map may comprise a table of elevations and GPS coordinates for those features. Other features of the golf course may also be included, such as fairway boundaries, cart paths, and the like. In embodiments, the computer readable map may comprise an overhead view of each hole and/or each green on the golf course.

The GPS receiver is operable to determine the first range to the target T from the device. The GPS receiver may be any conventional GPS receiver for determining a current location of the device based on wireless communication with at least one GPS satellite to receive GPS coordinates defining its location. The first range to the target T is determined by comparing the current GPS location of the device to a known GPS location at or proximate to the target T. The known location of a target T can be obtained by the processor accessing the computer readable map to obtain GPS coordinates for the target T. For instance, the target T may be a portion of a golf course, such as a green or a pin positioned on the green, as described below in more detail.

The GPS receiver may also include memory and processing capabilities separate from the computing element and memory, such that the GPS receiver is operable to determine the first range to the target T without the assistance of additional components. However, the GPS receiver may rely upon the capabilities provided by the computing element and memory to specifically calculate and determine the first range. The first range preferably represents a length of an imaginary line drawn between the device and the target T, such as the number of feet, meters, yards, etc, directly between the device and the target T. The first range may also represent other units of measurements, such as an estimated golf club length required to reach the target T.

The GPS device is operable to determine a first range to a target even when objects, such as trees, people, vehicles, foliage, etc, are positioned between the device and the target. As a result, the GPS receiver may determine the first range to the target T in a variety of situations, including on golf courses and other outdoor situations where various trees, other foliage and/or terrain may obstruct a direct view of the target T.

The current location of the device relative to the target T may alternatively or additionally include other range sensing components, such as conventional optical, radio, sonar, or visual range sensing devices to determine the first range in a substantially conventional manner.

Notably, GPS provides horizontal distances. That is, the GPS is configured to report a location of a GPS receiver assuming an essentially smooth spherical surface, which is further simplified by projection of the three-dimensional spherical location onto a two-dimensional horizontal map. Stated another way, the GPS converts the location of a GPS receiver from its location on a globe to a location on a flat map. Similarly, GPS coordinates of a known location also refer to a horizontal map. Thus, a distance between two GPS-determined points is a horizontal difference that does not account for differences in elevation between the two points.

The device preferably determines the angle θ by first determining the elevation (altitude) of the current location of the device and subsequently comparing it to the elevation of the target T obtained from the computer readable golf course map. The elevation of the device can be determined by measuring the atmospheric pressure using a pressure sensor and the ambient temperature using a temperature sensor. The elevation at any point can be calculated using a hypsometric formula.

An example algorithm to convert temperature and pressure to elevation is:

$$h=((Po/P)^{\wedge}(1/5.257)-1)*(T+273.15)/0.0065 \quad \text{(Eqn. 1)}$$

where h is in meters above sea level; Po is sea level pressure 1013.25; P is atmospheric pressure (hPa) and T is temperature (° C.).

Another example algorithm to convert temperature and pressure to elevation is:

$$H=(29.27177)*(T+273.15)*3.28084*\ln(1013.25/Pa) \quad \text{(Eqn. 2)}$$

where H is height (ft above nominal sea level); nominal sea level pressure is 1013.25; T is temperature in ° C.; and Pa is Pressure (hPa).

Though there is an absolute difference between these two algorithms, the relative difference is small over reasonable ranges. There are other algorithms for converting pressure and temperature values to elevation. Pressure sensor vendors often provide their own optimized algorithm and source code for calculating pressure. A variety of algorithms may be used as the accuracy required is over small pressure changes instead of larger pressure changes.

It may be appreciated that the atmospheric pressure varies due to weather conditions, so the device comprises a calibration feature to account for pressure variance due to weather conditions.

When the device recognizes it is on a tee box by referencing its GPS coordinates from the Map Database, the device will calculate an ElevationOffset. The internal pressure sensor and temperature sensor in the device or remote from the device can provide pressure and temperature data used to calculate a pressure elevation for the device. The device determines the actual pressure at the tee box and uses an algorithm such as described above to determine a measured elevation or ElevationPressure, which may not match exactly with the elevation of the tee box in the Map Database. The difference between the measured elevation and the elevation in the map database is used to determine a correction factor to correct for the pressure observed during play. When at a Tee Box, the ElevationOffset=ElevationPressure−Elevation of Tee Box in the map database. It may be appreciated that the ElevationOffset may comprise a component related to the height difference between the device as carried by the user and the ground level at the tee box so that the elevation of the lie of a ball on the ground is used in calculating the slope.

As the device moves through the course, the processor will continue to calculate the ElevationPressure using information from the internal pressure sensor and remote and/or integral temperature sensors and the algorithm. The device calculates its current UserElevation by calculating the difference between the observed ElevationPressure at its location and applying the elevation offset determined at a previous calibration step, such as at the hole's tee box. The calibration offset is then applied to the sensor elevation (ElevationPressure−ElevationOffset) to calculate the device's elevation, UserElevation, related to a reference point on the computer readable map. The UserElevation then can be compared to the elevations of any other target in the computer readable map. The device can calculate the difference between the UserElevation between any of the targets in the database. The elevation difference used for slope or compensated distance is the difference between the UserElevation and TargetElevation (from the map database).

Figure 4:
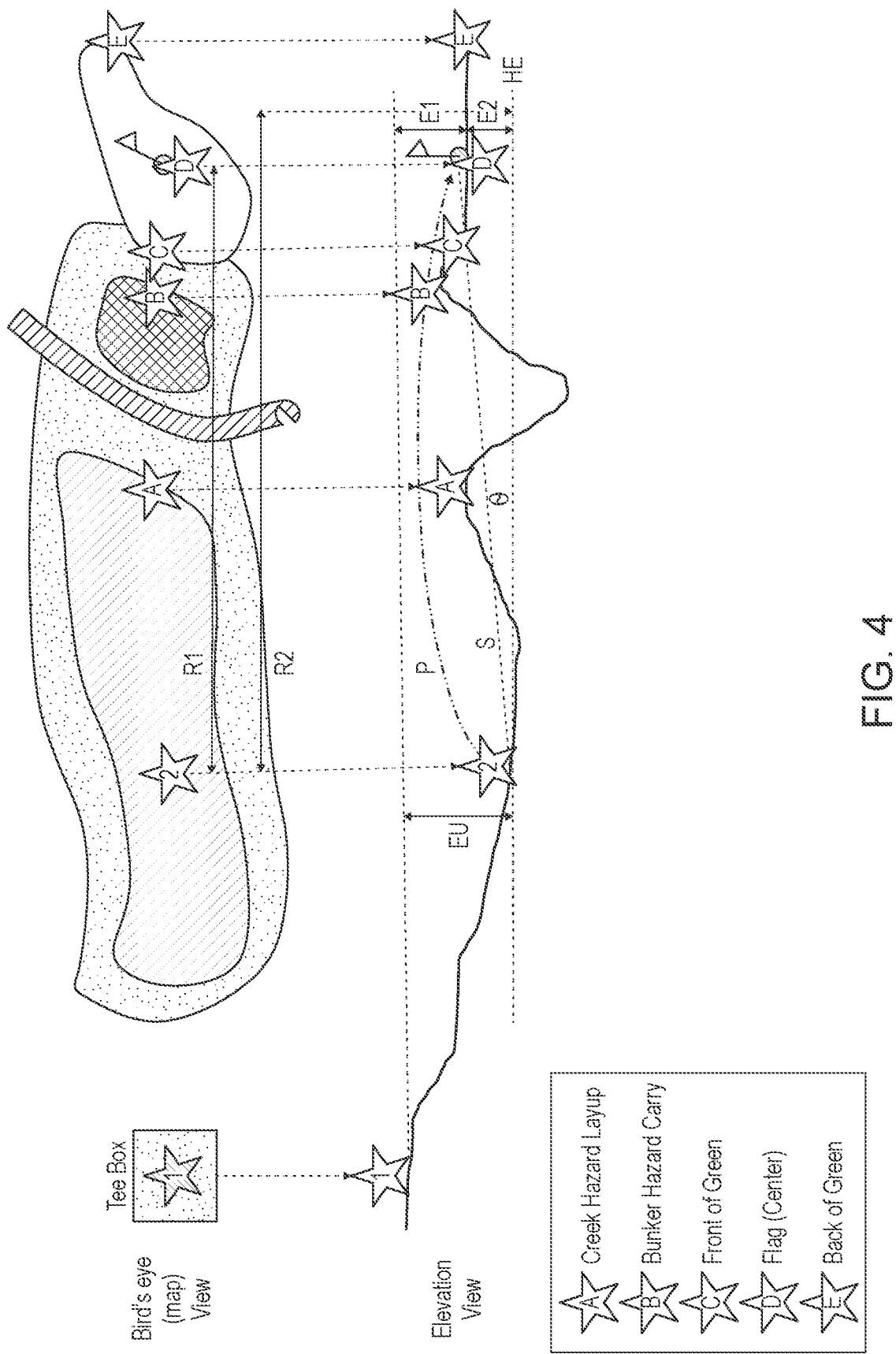
FIG. 4 depicts aspects of determining a second range to a target based on a first range and an angle to the target such that the ballistic trajectory of a projectile is accounted for in determining the second range, according to an exemplary embodiment of the disclosed subject matter.

FIG. 4 shows a bird's eye or map view and an elevation view of an example of a golf course hole where a device according to an exemplary embodiment determines a first range R1, a second range R2, and θ using an exemplary embodiment of the method. FIG. 4 shows a hole that comprises a tee box, fairway, creek hazard, bunker hazard and green. The horizontal and vertical scales are not the same in this figure. In the Figure, Star 1 indicates the tee box, star A indicates a creek hazard layup position, star B indicates a bunker hazard carry position, star C indicates the front of the green, star D indicates the flag (center) of the green and star E indicates the back of the green. Each of those positions can be obtained from the information for the hole provided in the map database. The map view is based on the GPS coordinates of each of the points indicated. Nominal distances between two locations can be calculated by finding the difference between the GPS coordinates of the two locations. The elevation view shows the elevations of each of these points, also available from the map database. Star 2 indicates a current position of the device, for example at the location of the player's ball in the fairway after a tee shot.

The first range R1 is determined by calculating the nominal or horizontal distance from the user's location at Star 2, determined by the device's GPS location, to the location of the target, Star D, based on its GPS coordinates in the Map Database. The angle θ is determined by comparing the elevations of the reference point Star 1 at the tee box, the target Star D at the pin from the Map Database, and the ElevationUser (EU) determined as described above. As shown in FIG. 4, E1 is the elevation drop from the tee box to the flag based on the Map Database. EU is shown as the elevation drop between the tee box and the user's position at Star 2. E2 is the elevation rise from the user position at Star 2 to the flag, determined by subtraction of E1 from EU. The angle θ is the angle defined by the horizontal elevation line HE and the slope line S, determined by the change in elevation E2 at first range R1.

The processor of the computing element determines the second range R2 to the target T based on the first range R1 and the determined angle θ. Preferably to conserve computing resources, the second range R2 may be determined statically such that the second range R2 is determined only at desired intervals or upon input by the user. Conversely, the second range may be dynamically determined such that the second range may be continuously updated as new first ranges or angles or provided, for example, as the device is moved around the course by the user.

The processor determines the second range R2 by adjusting the first range by a "slope" factor corresponding to the angle θ to account for the change in elevation between the golf ball's position at Star 2 and the target T. The factor adjusts the first range to account for an estimated trajectory of a projectile. Thus, the second range R2 preferably represents a distance the projectile must travel such that the estimated trajectory of the projectile generally intersects with the target T. In contrast, the first range represents the length of an imaginary line between the device and the target T, which is a substantially straight line, as described above. As is known in the art, projectiles that are not self-propelled, such as golf balls, footballs, arrows, etc., move through air according to a generally parabolic (i. e. ballistic) curve P due primarily to the effects of gravity and air drag. In situations where the angle θ is zero, the ballistic movement of the projectile does not substantially affect the range calculation. As shown in FIGS. 2B and 4, when the target T is higher in elevation than the user's elevation, R2 is longer than R1.

FIG. 4 shows an example where the target T is the flag or pin location. However, it may be appreciated that the target T may be other than the pin location. For example, a user may determine, based on the distance to the pin, that he would be unable to reach the pin from the golf ball's position at Star 2 with a single shot and may request a range determination to an alternate target such as shown at Stars A, B or C. Similarly, a dog-leg hole may include a target proximate to the vertex of the angle formed by the two portions of the dog-leg. The "slope" factor may be determined utilizing conventional and well-known algorithms or tables that account for the generally parabolic or ballistic movement of a projectile through air based on a source angle of the projectile and adjusting it for the change in elevation. Preferably, the factor is determined based on the angle θ and a multiplier corresponding to the tangent of the angle θ. The factors, and associated information, as described below, may be stored in the memory 314 to facilitate and expedite calculations by the computing element.

The second range R2 determined as described can be used to define a "PlayAs" distance that is different from the nominal or GPS difference between the device's location and a target T.

Other factors such as ambient temperature and air density (pressure) that can influence a golf ball's flight may be also be considered in the "PlayAs" distance. As noted, the device described herein comprises an integralpressure sensor and integral or remote temperature sensors, so that temperature and pressure can be included in the calculation of the "Play As" distance using an algorithm for ballistic flight of a golf ball that includes those variables. The GPS device 1 uses internal algorithms and processors to make the calculations and suitable adjustments.

In embodiments, the device disclosed herein calculates a "Play As" distance as a combination of a first slope correction based on the R2 distance determined by the change in elevation between the golf ball's position and the target T (slope), which is determined using a pressure/temperature elevation algorithm as described above, and additional environmental or "elements" correction factors based on the effects of the current temperature and air pressure on the ballistic flight of a golf ball.

Table 1 shows a comparison of a PlayAs distance that is solely slope compensated and a PlayAs distance that is both slope and elements compensated.

In this example, a golfer's lie on a hypothetical hole is compared when the hole is located in New York State near sea level or when the hole is located at the Legend Trail in Scottsdale, Ariz., which is significantly higher in elevation. As determined by GPS coordinates from the GPS satellite for the lie and the GPS coordinates for the target from the course database, the distance of the lie is determined for the front, center and back of the green. For this example, the lie is 167 yards from the center of the green in both locations. The slope is calculated as described above by comparing the lie's elevation to the elevation of the target(s) using the pressure and temperature algorithm compared to the target(s). The negative slope indicates that the target is downhill from the lie. The PlayAs distance is determined using the geometric relationship between horizontal distance, actual distance and angle θ compared to a standard ballistic trajectory normalized to a set of standardized pressure and temperature conditions. Given the slope value of −7%, the PlayAs Distance shown is considerably shorter than the GPS distance. We see the Center distance will PlayAs if it were 11 yards shorter. The elevation difference between the hole located in New York and the hole located at Sottsdale can further affect the PlayAs distance and impact how the golfer should address the shot. The higher elevation means that the air density (pressure) is less and the air resistance to the golf ball's flight is also less. Consequently, a golf ball at Scottsdale will travel farther than a golf ball in New York struck with the same force. An elevation compensation factor can be applied as a second step to further adjust the PlayAs distance. In this example, the Center will PlayAs an additional 7 yards shorter when compensated for the higher elevation at Scottsdale.

Temperature can also impact a ball's flight distance because a warmer ball is more dynamic than a ball in cold temperatures. For example, a ball hit at 80° F. (27° C.) will travel farther than a ball struck with the same force at 65° F. (18° C.). Therefore, in a third step, a temperature compensation factor can further adjust the PlayAs distance to account for the actual temperature observed during the calculation. It may be appreciated that ambient temperature at the time of calculation has a relatively small impact on the elevation calculation for slope determination and the effect of elevation on the ballistic flight of the ball. However, ambient temperature may have a significant impact on the ballistic flight of the ball, so a temperature compensation may be desirable.

Notably, the pressure and temperature data obtained by the device described herein may be used to calculate the slope compensation and the elevation and temperature compensations. This makes a PlayAs distance determined using pressure and temperature factors as described herein more relevant to the conditions at time of play than conventional rangefinding systems that do not use pressure and temperature in range calculations.

TABLE 1

| | GPS | | PlayAs Distance | |
|---|---|---|---|---|
| | Distance (Yds) | Slope | Slope Compensated | Slope + Elevation Compensated |
| Front | 151 | −7% | 143 | 136 |
| Center | 167 | −7% | 156 | 149 |
| Back | 183 | −7% | 170 | 163 |

The pressure elevation determined by the device for the slope compensation as determined using elevation and temperature compensations are also affected by ambient pressure and temperature changes as play proceeds over the duration of a round of golf, so it may be important to recalibrate the device often to ensure accurate determination of the compensations. For example, recalibration is desirably done at each Tee Box. As noted above, the GPS device can determine if it is at a tee box at a given hole by comparing its GPS location to the GPS coordinates for the tee box obtained from the computer readable map. When the GPS coordinates of the device and the tee box match, within a specified margin such as a defined radius around the GPS coordinates of the tee box, the device will take pressure and temperature information using its integral pressure sensor and integral or (preferably) remote temperature sensor to calculate an ElevationOffset to be used for that hole.

The temperature value may be provided by the temperature sensor attached to the GPS device 346a, attached to or used by the golfer, or obtained from a remote sensor 346b by wireless communications, or may be entered by the user. The temperature information may be provided by publically available weather sourcing information or by sensors. In embodiments, the golfer can observe and enter a temperature.

As indicated above, the device may continually monitor its GPS position, pressure and temperature to recalibrate autonomously when the device determines it is at a tee box. Alternatively, to save calculation power, the device may only continually monitor its GPS position and selectively obtain pressure and temperature data when it determines it is at a tee box by matching its GPS position to the GPS position of the tee box in the computer readable map. Alternatively, the recalibration may be initiated by a user inputting a recalibration request.

Alternatively, recalibration may be done at a green. For example, elevation information may be available for the men's tee box but not the women's tee box for a golf course. For golfers playing from the women's tee boxes, calibration at a hole's green may be used to calculate an elevation offset for the next hole. Greens can also be helpful as a check to determine if the calibration is still valid. Calibration at a green may be less accurate, but may help in situations where a tee box calibration is skipped. Tee boxes are generally level, so an elevation calibration anywhere in the tee box is likely to be consistent no matter where it is conducted. However, greens may differ in elevation in one or more directions from the point on the green where the green's elevation was tabulated in the database, which could introduce an error in the determination of PressureElevation compared to the database elevation. Further, the golf course operator may periodically move the location of the flag or pin to various locations in the green, leading to uncertainty where the green's elevation was measured for the database.

The GPS device comprises a user interface for receiving inputs from a user and providing information to the user. User input can be provided to the device by one or more buttons or switches on the device as described above for FIG. 1, or by use of an app in wireless communication with the device. In embodiments, the user input may be communicated for example by pressing buttons, tap signals, or verbally for microphone-equipped devices.

The GPS device comprises a display to provide information to a user, such as an LED or LCD display. Information may include a measured distance readout (e.g. R1 described above) and may include additional information such as "PlayAs" distance (e.g. R2 described above, optionally including elevation and/or temperature compensations), information about the hole being played, including for example its par value, total distance, distance to front of green, distance to back of green, and distances to hazards. Other information displayed may include stroke count, battery information, and other indicators of device operation.

In embodiments, the display comprises icon(s) indicating whether the Slope function is enabled (on) or disabled (off). For devices with Slope, the device will have the ability for a user to enable or disable Slope mode. This means an icon is desirable to indicate Slope is enabled, and a variation of that icon is needed to indicate when the distance values are actually showing slope values. If Slope mode is enabled, that is highlighted to the user by display of a specific icon. The GPS range and the "PlayAs" range may be displayed. If Slope mode is disabled, that status may be indicated by the absence of the Slope icon or the display of a different icon, and there are no changes to any distances displayed on the screen. For example, no "Play As" distance would be displayed or it would be displayed as the same distance as the GPS distance. Further, not all courses may have elevation data that the device can use to calculate a slope. If the slope cannot be calculated, then the non-slope value is shown. The Slope icon may be configured to indicate that the Slope mode is enabled, but elevations are not available, so a "PlayAs" range cannot be calculated.

Figure 5A:
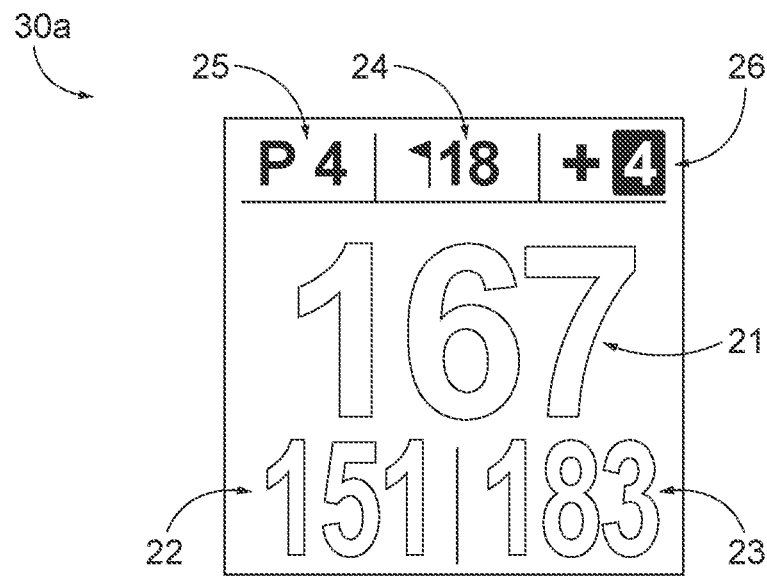
FIGS. 5A-D depict displays displaying distances to the front, center and back of a green, according to an exemplary embodiment of the disclosed subject matter.
Figure 5B:
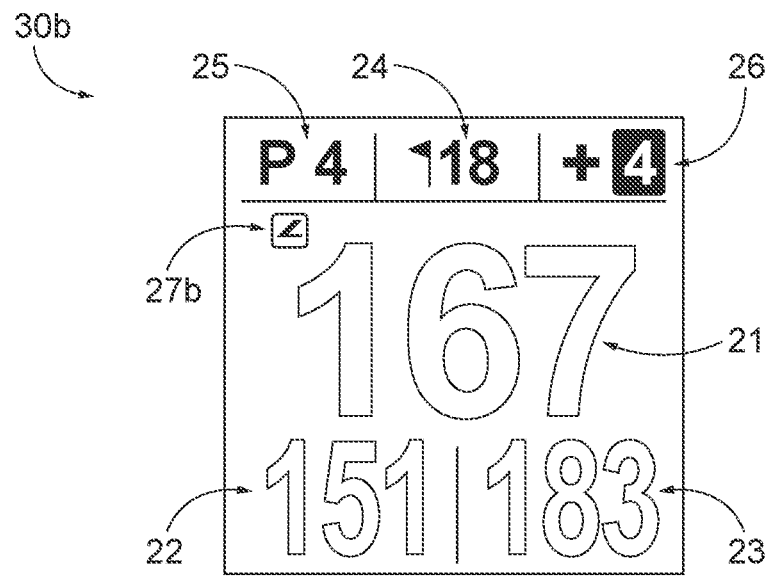
Figure 5C:
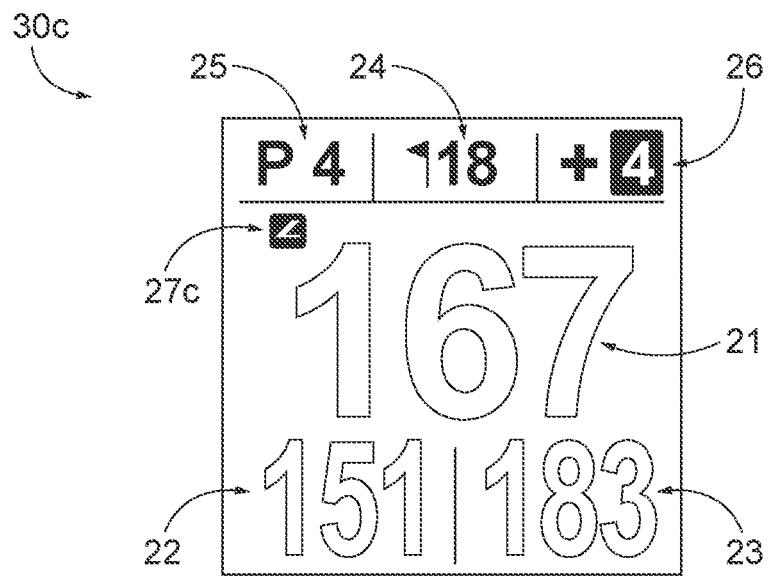
Figure 5D:
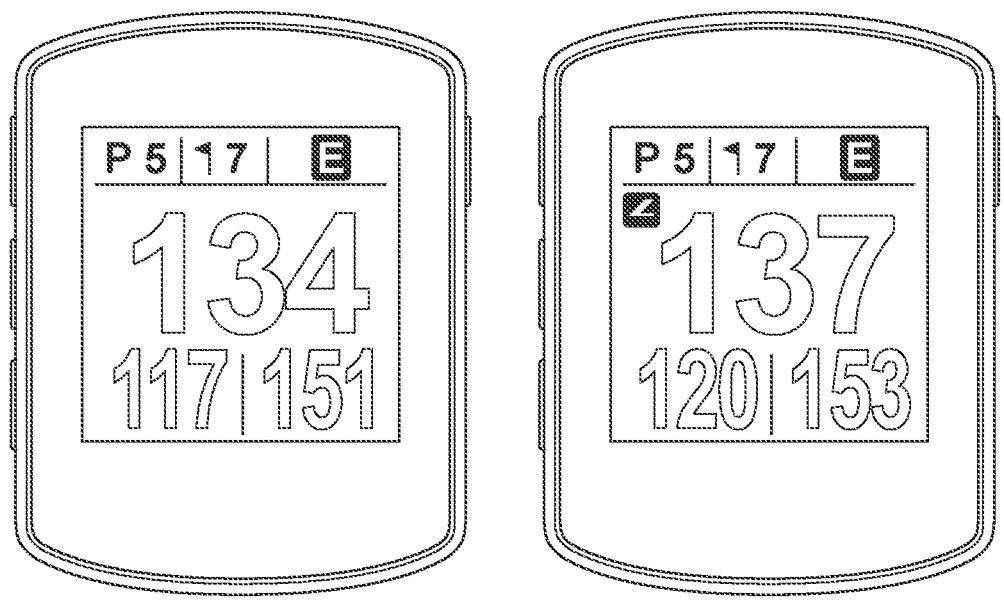

FIGS. 5A-5C show exemplary displays in which distance information is shown. In these figures, the display summarizes distance information for front, center and back of the green. In FIG. 4A, the Slope function is turned off and no Slope icon is shown in display 30a. Display 30a shows the current GPS distance to the center of the green 21, front of green 22 and rear of green 23 in yards. In embodiments, the distance unit may be switched to display the distance in meters. The current hole number is shown at 24. Par for the current hole is shown at 25 and the golfer's current total score for the round is shown at 26. In embodiments, the golfer's score may be displayed as either the golfer's scope compared to par for the course (shown) or the total stroke count. FIG. 5B shows a display 30b wherein the Slope function is enabled, but corrected distances are not displayed due to, for example, a lack of elevation data to enable a slope correction to be calculated. An "open" Slope icon at 27b is illuminated in the display 30b that indicates slope is on, but uncorrected GPS distances are shown. FIG. 5C shows a display 30c wherein the Slope function is enabled and calculated "PlayAs" distances are displayed. A "closed" Slope icon at 27c is illuminated in the display 30c that indicates slope is on and calculated distances are shown. FIG. 5D shows a depiction of devices wherein the Slope function is disabled (left) and enabled (right). The photo shows how calculated PlayAs distances may differ from GPS distances.

Figure 6A:
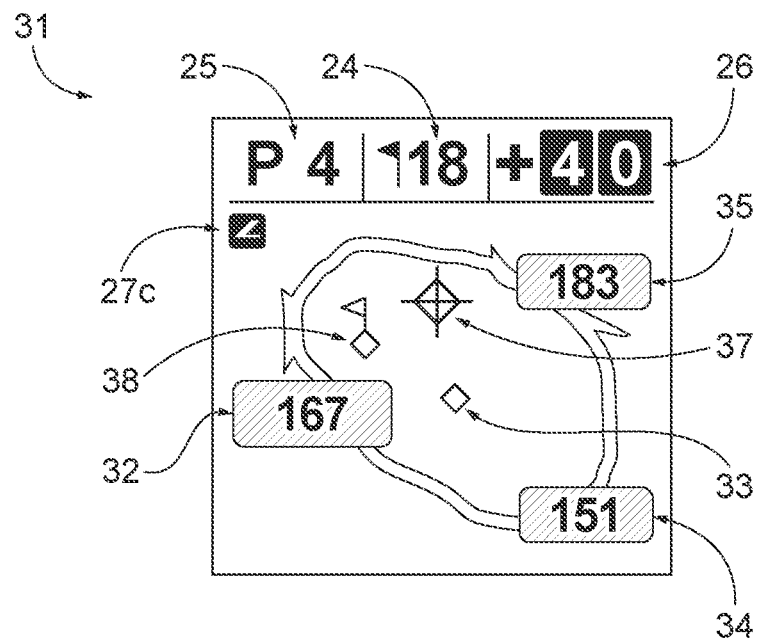
FIGS. 6A-B depict displays showing a Green View, according to an exemplary embodiment of the disclosed subject matter.
Figure 6B:
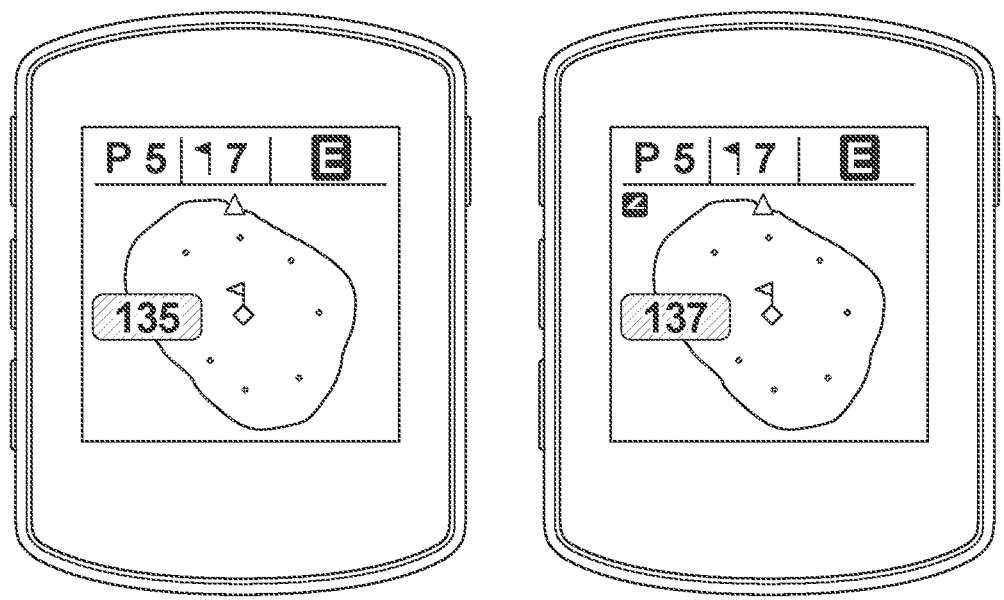

FIG. 6A shows an image of a Green View display 31. In this view, a map of the green is shown and the distance to the center of the green 33 is shown in block 32. Distances to the front and back of the green are shown at blocks 34 and 35, respectively. The closed slope icon 27c indicates that PlayAs distances are displayed. Typically, the course groundskeeper may move the cup or pin anywhere within the green area to vary play among different days, reduce wear on the green, etc. So the actual location of the pin may be more relevant to a golfer than any of those tabulated distances. In embodiments, the Green View comprises a movable cursor 37 that the golfer can move around the green map to define an observed pin placement 38. When a pin placement is made in the Green View by a golfer, the distance to the center 33 is replaced by the distance to pin placement 38. One can appreciate that because pin placement 38 is variable, its elevation may not be included in the map database. In that case, the elevation of the pin placement can be estimated from the elevation of the nearest of front, center or back elevations, or a weighted average of the elevations of the front, center and back elevations. Alternatively, if the elevation of a pin placement cannot be determined, an open Slope icon (see FIG. 5B) is displayed and the center distance is displayed. FIG. 6B shows a depiction of devices showing Green View displays wherein the Slope function is disabled (left) and enabled (right). The depiction shows how calculated PlayAs distances may differ from GPS distances. In this embodiment, only the distance to the center of the green or the pin placement is shown.

Figure 7A:
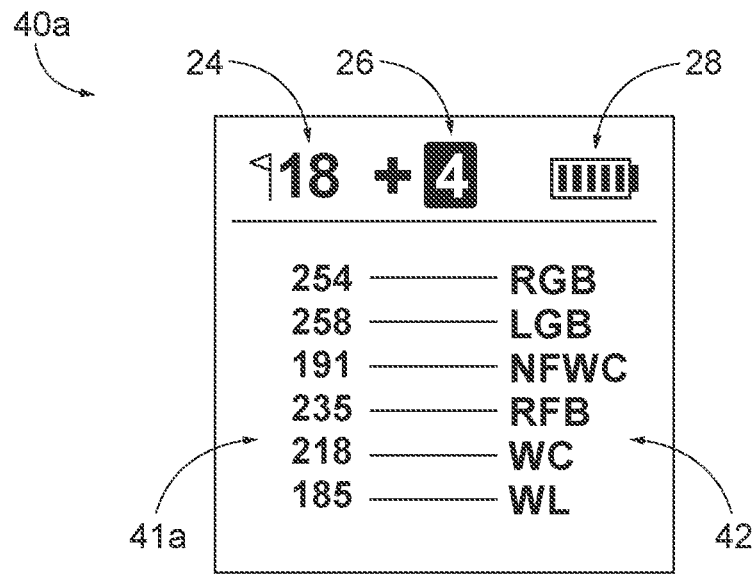
FIGS. 7A-C depict displays displaying distances to hazards, according to an exemplary embodiment of the disclosed subject matter.
Figure 7B:
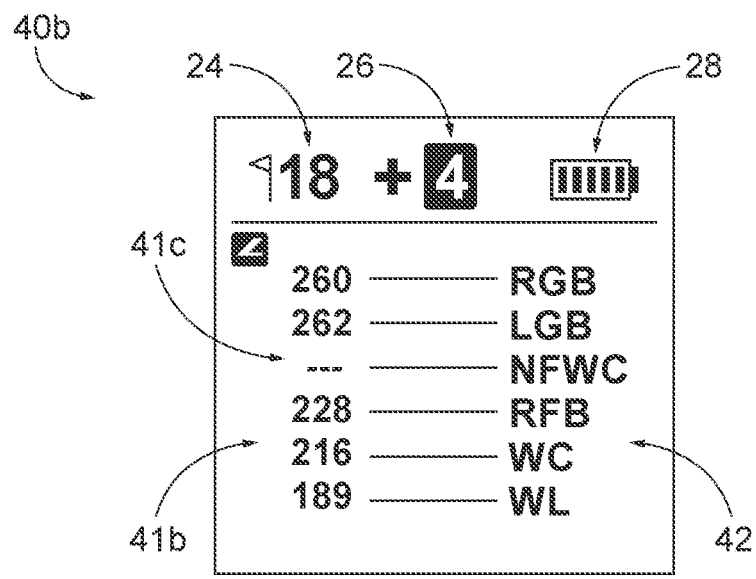
Figure 7C:
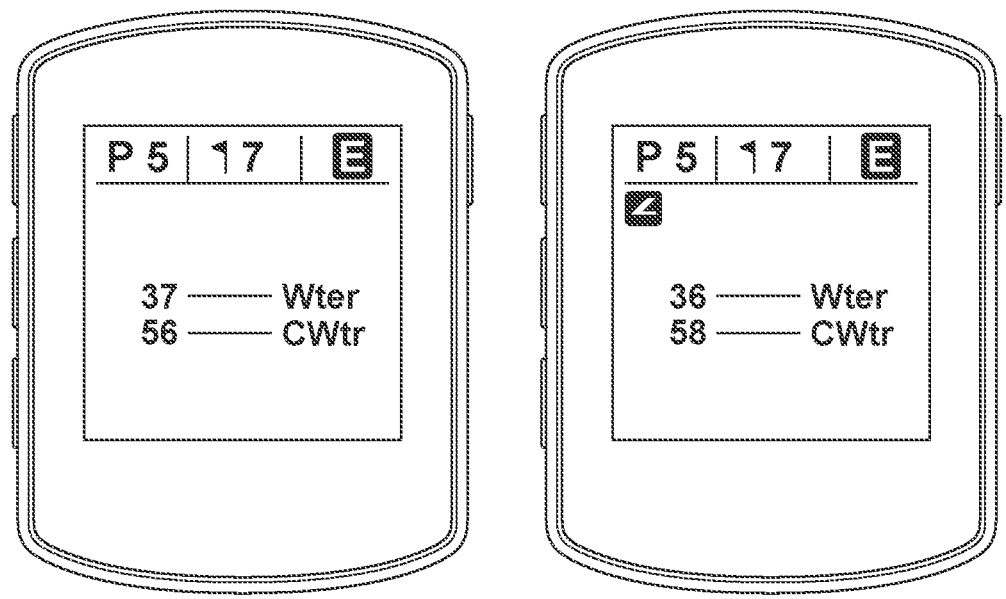

FIGS. 7A-C show image of a Hazards display, wherein distances to up to six different hazards are displayed. In FIG. 7A, the Slope function is turned off and no Slope icon is shown in display 40*a*. GPS distances 41*a* to the hazards 42 are shown. A battery charge indicator is shown at 28. In FIG. 7B, the Slope function is turned on and a closed Slope icon is shown in display 40*b*, indicating that "PlayAs" distances are displayed. PlayAs distances 41*b* to the hazards 42 are shown. Where a PlayAs distance cannot be calculated, for example, when the elevation of a hazard cannot be found in the database, it is indicated by three hyphens. In embodiments if the GPS coordinates of the current lie indicates that the golfer has passed beyond a hazard, the hazard is removed from the display, allowing for an additional hazard to be displayed as needed. FIG. 7C shows a depiction of devices showing Hazards displays wherein the Slope function is disabled (left) and enabled (right). The depiction shows how calculated PlayAs distances may differ from GPS distances.

Figure 8:
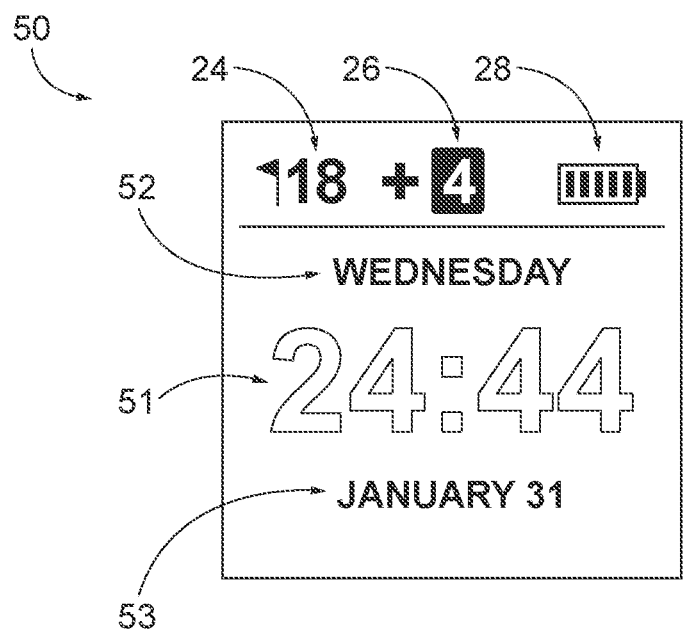
FIG. 8 depicts a clock display, according to an exemplary embodiment of the disclosed subject matter.

FIG. 8 shows an image of a Clock display 50. In this view, a time is displayed at 51, which in embodiments may be the current time of day, or an elapsed time stopwatch feature. For example, a golfer may clock the total elapsed time for a round, or time of play for a specific hole. In embodiments, a user can scroll and select among different time displays using scroll up and scroll down buttons. Day and date are displayed at 52 and 53 respectively.

Other display views include a Home view, in which a golf course can be selected from one or more courses in the database, based on the proximity of the course's GPS coordinates to the device's GPS location as determined by the controller of the device. In some instances, more than one course is possible based on the GPS comparison, such as where two courses may be associated with a single clubhouse where a user powers up the device. In those instances, a user can scroll and select among different courses using scroll up and scroll down buttons.

Another display view may display the current air pressure and temperature obtained from the pressure and temperature sensors associated with the device used to determine elevation and slope corrections.

Still other factors may be included in the "PlayAs" calculation.

In some embodiments, a golfer's ability, such as characterized by the golfer's handicap, may also be entered into the device to allow the computing element to consider that factor to adjust the "Play As" distance. In other embodiments, a golfer may enter an average hitting difference using one or more club types to allow the device to determine the golfer's ability to hit a golf ball in a ballistic flight path based on the player's strength and skill in hitting using a given club. One can appreciate that less proficient golfers may hit a flatter and/or slower shot than more proficient golfers. One may also appreciate that the player's ability need not be entered for each round of golf but may be entered one time and amended as necessary as the golfer's ability changes over time.

Figure 9:
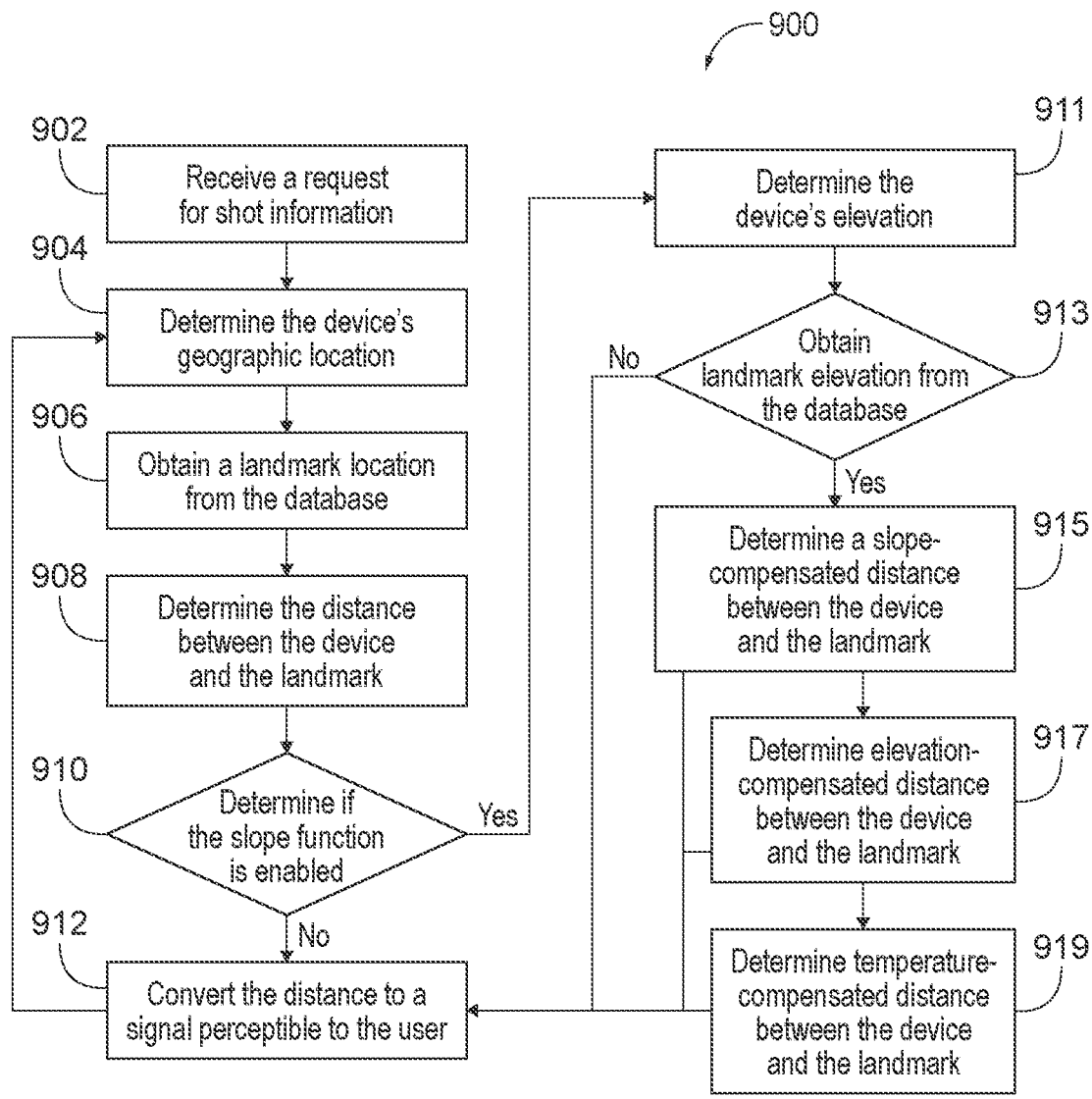
FIG. 9 depicts a process flow diagram for a method for determining distances from the device to a landmark, according to an exemplary embodiment of the disclosed subject matter.

FIG. 9 depicts a method of obtaining shot information related to the distances determined according to aspects of the present disclosure. As described herein, and shown in block 902, the GPS-enabled portable device may receive a request for shot information. Generally, shot information comprises distances determined by the device using the methods described herein by a controller executing computer readable instructions. A user, such as a golfer, wishing to receive information on the device's location or surrounding environmental features, may initiate the request by actuating a user input on the GPS-enabled mobile device and the request is transmitted to a controller on the GPS-enabled mobile device. In embodiments, the user powering up the device will be taken by the controller to constitute a request for shot information and will cause the controller to move to block 904 to autonomously and optionally continuously determine the device's geographic location as discussed for block 904 without additional input from the user. In some embodiments, to save battery life, after being powered up by the user, the controller may enter a "sleep" mode that requires a user input to request shot information. For example, "sleep" mode may be entered after a pre-determined period of time in which the device's location doesn't change and a location change is interpreted by the controller as a request for shot information. Alternatively, the "sleep" mode may comprise the controller determining, based on GPS information, that the device is in continuous motion and a stoppage of motion is indicative of a user at a current lie of the ball where shot information may be desired. While aspects of the present disclosure provide for a pressure activated user input, using a button or touch pad, one skilled in the art will recognize that other triggers may be implemented to initiate a shot information request, including tap signals or voice commands. In other embodiments, a change of orientation of the device indicative of the device being positioned for a user to read the display may be understood by the controller to constitute a request for shot information. In embodiments, the device is carried by the user such that the device's location and elevation is essentially that of the user carrying the device.

As shown in block 904, the controller may determine the device's (user's) geographic location using the mobile device's native GPS functionality or another location service in an installed application. Application software on the remote device may include local environmental information relating to the user's location. For example, the application software may include maps, elevations, distances, or the like relating to a golf course and/or gameplay on which the user is located.

As shown in blocks 906 and 908, the controller, relying on the device's geographic location, may correlate the user's location with the geographic data of the application software to generate shot information. The shot information may include information as to the user's location in or on a defined area, such as a golf course, various landmarks, markers, or the like. According to one aspect, the application software may include or access a database storing GPS information of a number of golf courses. Based on the geographic location, the controller may determine the golf course on which the user is located. The controller may correlate the geographic location with the location information of the identified golf course to generate the shot information. The shot information may also include an elevation, distance, or other gameplay information relating to the user's location and a target, such as a flagstick, bunker, or other known landmark. In block 906, the controller obtains a landmark location, such as embodied in GPS coordinates, from the database. In block 908, the controller calculates the distance between the user's location and the landmark location. This distance corresponds to first range R1 in FIG. 4.

In block 910, the controller determines whether the slope function is enabled. If the slope function is enabled, the controller proceeds to block 911. If the slope function is not enabled, the controller proceeds to block 912.

As shown in block 912, the shot information related to the distance from the user to a landmark may be converted into a signal capable of being converted to visual information displayed on a display screen on the GPS device to convey the shot information to the user. For example, the shot information may indicate that the user is 100 yards from the flagstick of the current hole. In some embodiments, the shot information, for example, may be converted to an audio signal that states "You are 100 yards from the flagstick." in addition to or instead of visual information on a display.

Figure 10:
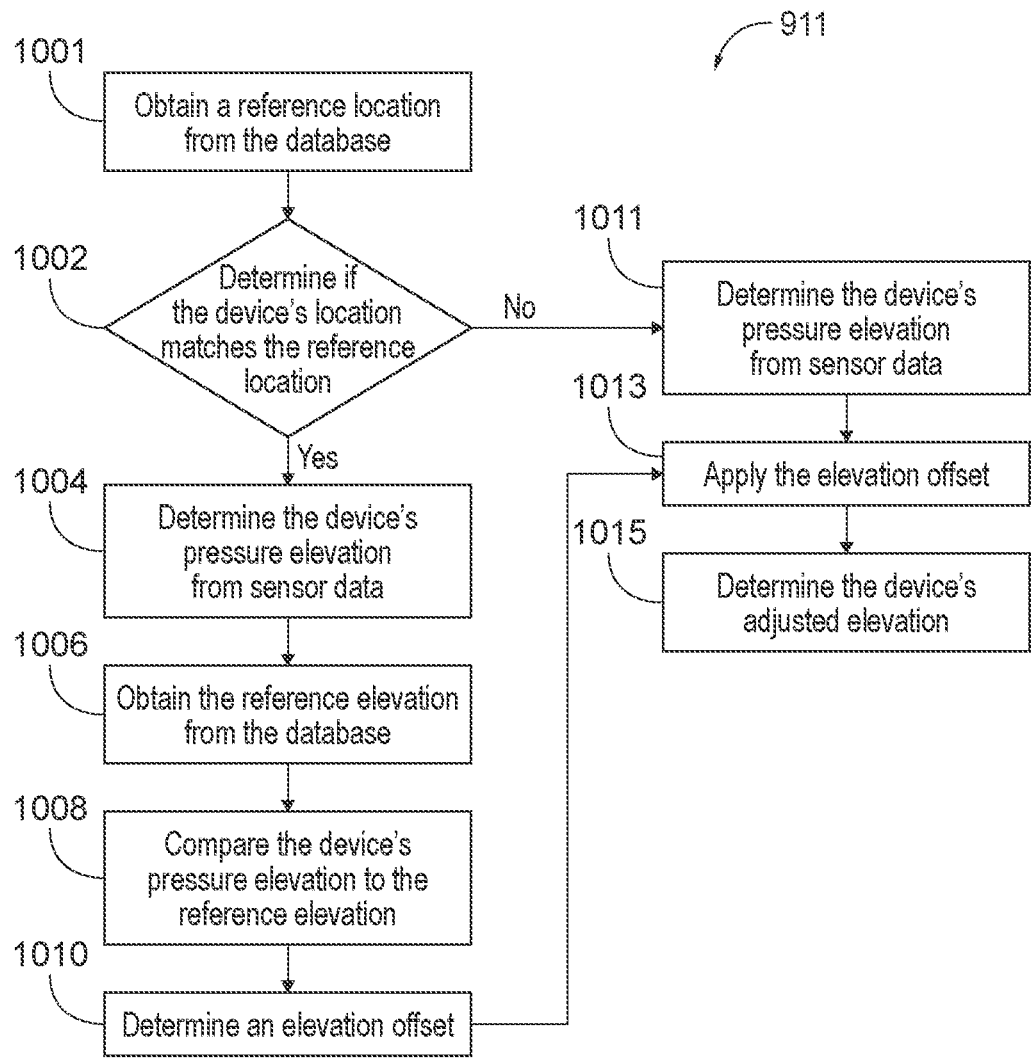
FIG. 10 depicts a process flow diagram for a method for determining the device's elevation, according to an exemplary embodiment of the disclosed subject matter.

In block 911, the controller determines the user's elevation using pressure and temperature information received from sensors associated with the device, as described in more detail in FIG. 10.

In block 913, the controller obtains the landmark's elevation from the database and proceeds to block 915. If the controller cannot obtain the landmark's elevation from the database, it does not determine a slope-corrected distance and moves to 912 to convert information that slope-corrected distance cannot be reported to a signal perceptible to the user.

In block 915, the controller uses the distance information obtained in block 908, the user's elevation from block 911 and the landmark elevation from block 913 to calculated an slope-corrected distance or PlayAs distance, which corresponds to second range R2 in FIG. 4. After calculating the slope-corrected distance, the controller moves to block 912 to convert the slope-corrected distance to a signal perceptible to the user. As described above, the signal includes an indicator that slope-corrected distance is displayed.

In embodiments, the PlayAs distance may be further compensated by determining an elevation-compensated distance between the device and the landmark (block 917) and/or a temperature-compensated distance between the device and the landmark (block 919) based on the effects of elevation and temperature on the ballistic flight of a golf ball as described above. In embodiments, the controller may determine that the observed elevation and/or temperature at the onset of play will have a negligible effect on the ballistic flight of the golf ball. For instance, the elevation effects may not significantly affect the PlayAs distance because the observed elevation is within a defined range around the elevation used in the standard or default value for the effects of elevation on ballistic flight. In that instance, the controller may autonomously determine that calculations for block 917 are not needed and skip to block 919 and/or move to block 912. In another instance, the temperature effects may not significantly affect the PlayAs distance because the observed temperature is within a defined range around the elevation used in the standard or default value for the effects of elevation on ballistic flight. In that instance, the controller may autonomously determine that calculations for block 919 are not needed and return to block 917 and/or block 912. If the observed pressure and temperature are determined to result in negligible effects on the ballistic flight, the controller will skip both blocks 917 and 919. If the observed pressure and temperature are determined to result in non-negligible effects on the ballistic flight, the controller will determine compensation in both blocks 917 and 919. In any of these instances, the determination of pressure and temperature corrections can be done without displaying the determinations separately from the slope-corrected distance such that a single PlayAs distance is reported to the user.

After the distance is converted to a signal perceptible to the user in block 912, the controller returns to block 904 to determine the device's location again. It is appreciated that this process flow diagram provides for the controller to autonomously and continuously determine the device's location without additional user input. In embodiments with a "sleep" mode, the controller in block 904 may also determine if a user request for shot information as discussed above (block 902) has been received since its last location determination.

FIG. 10 depicts a method of determining the user's elevation used in block 911 of FIG. 9, according to an aspect of the present disclosure. As described herein, and shown in block 1002, the GPS-enabled mobile device determines whether the user's location from block 904 matches a reference location obtained from the database (block 1001). After the user's location is determined in block 904 of FIG. 9, the controller will search the database for location of reference points having a proximity to the user location's GPS coordinates and attempt to match reference coordinates with the user location's coordinates. For example, a user standing between the markers at a tee box will have a location that is within a few feet or less of that tee box's location stored in the database. If the controller determines that the user location matches that of a reference location, the controller will move to block 1004.

In block 1004, the controller will request and obtain pressure and information from the pressure sensor on the device and temperature information from integral temperature sensor 346a or remote temperature sensor 346b to determine a pressure elevation according to an algorithm as described above.

In block 1006, the controller requests and obtains the elevation of the reference location that is stored in the database.

In block 1008, the controller will compare the pressure elevation determined contemporaneously using pressure and temperature information to the elevation of the reference location that is stored in the database. As described above, the elevation at the reference location determined based on the observed pressure and temperature from sensor data is variable, while the reference elevation from the database is fixed. Generally, the pressure elevation and the database elevation are slightly different because of the variable environmental conditions.

In block 1010, the controller determines an elevation offset based on the difference between the reference elevation stored in the database and the pressure elevation.

The steps of blocks 1004 through 1010 may be considered as a calibration of the GPS-enabled device disclosed herein to align elevations determined empirically using sensor data to reference elevations from the database. In embodiments, the GPS location of the device is continuously updated so that the controller can autonomously determine it is at a reference location and perform calibration steps 1004 through 1010 regularly throughout a round of golf, such as at each tee box. In that way, the elevation offset determined at a tee box is used throughout the hole associated with the tee box where the calibration occurred.

If the user location does not match that of a reference location the controller will move to block 1011. For example, the user location may be within the fairway after a tee shot, corresponding to Star 2 in FIG. 4. In block 1011, the controller will request pressure and temperature information from pressure and temperature sensors as described for block 1004 to determine a pressure elevation according to an algorithm as described above.

In block 1013, the controller applies the elevation offset determined in the calibration step of block 1010 to the elevation based on pressure and temperature information determined in block 1011 to determine an adjusted elevation. The adjusted elevation is used in block 915 of FIG. 9 to determine the slope compensated distance from the user's location to a target location, such as to a pin on the current hole's green.

It may be appreciated that if a user requests shot information from a tee box to a target such as the green, the locations and elevations of both are in the map database and there is no need to determine the user's elevation using sensor information. The slope-corrected distance can be determined just from database distance and elevation information. However, environmental conditions of elevation and temperature that can affect the flight of the golf ball are obtained from sensor information to determine elevation and/or temperature compensations to the PlayAs distance if needed. Further, the device will collect sensor information and determine an elevation offset for use in subsequent requests for shot information where elevations are not in the map database as the golfer progresses toward the green.

While aspects of the present disclosure may provide functionalities and capabilities located in the GPS device itself, one skilled in the art will recognize that some of those functionalities may be located, processed or otherwise carried out on a remote device coupled to the GPS device without deviating from the scope of this disclosure.

While aspects of the present disclosure provide for a GPS system to be used on a golf course by a golfer, one skilled in the art will recognize that the use and applicability of the GPS system as described herein is not so limited and may be used in other environments.

One aspect of the foregoing disclosure is a device or system for determining distances, the device comprising a controller, a global positioning system (GPS) receiver, a pressure sensor; a temperature sensor in communication with the controller; and a non-transitory computer readable storage medium comprising a plurality of computer readable instructions embodied thereon which, when executed by the controller, causes the controller to determine the device's geographic location based on first coordinates from the GPS receiver; obtain a location of a landmark based on second GPS coordinates from a database; determine a distance between the device and the landmark using the first and second GPS coordinates; and convert the distance to a signal perceptible to a user.

Embodiments of the device or system include the following, alone or in any combination.

According to at least one non-limiting exemplary embodiment the controller on the device or system is further configured to execute the computer readable instructions to determine the device's elevation based on pressure and temperature values received from the pressure sensor and the temperature sensor using an algorithm; obtain the landmark's elevation from the database; determine an elevation-compensated distance between the device and the landmark; and convert the elevation-compensated distance to a signal perceptible to the user.

The controller determines the device's elevation based on pressure and temperature values received from the pressure sensor and the temperature sensor and applying an elevation offset factor.

The controller determines the elevation offset factor by executing computer readable instructions to obtain a reference location from the database; determine that the device's location matches the reference location; determine the device's pressure elevation based on pressure and temperature values received from the pressure sensor and the temperature sensor; obtain a reference elevation from the database; compare the device's pressure elevation to the reference elevation; and determine the elevation offset factor such that the device's pressure elevation and the elevation offset factor equals the reference elevation.

In embodiments, shot information comprises a distance between the device and a landmark location or comprises a slope compensated distance between the device and a landmark location and elevation.

The device or system may be used to determine location and elevation information on a golf course, such as wherein the device's location and elevation is determined at a current lie of a golf ball.

The landmark may be selected from the group consisting of tee boxes, green fronts, green centers, backs of greens, flagsticks, pin positions, cups, green perimeters hazards, bunkers, traps, water features, roughs, fairway boundaries and cart paths. The reference location may be a tee box or green.

Also provided is a non-transitory computer readable storage medium comprising a plurality of computer readable instructions embodied thereon. The instructions, when executed by a controller of a device comprising a controller, a global positioning system (GPS) receiver, a pressure sensor; and a temperature sensor in communication with the controller; cause the controller to: determine a device's geographic location based on first coordinates from the GPS receiver; obtain a landmark location based on second GPS coordinates from a database; determine a distance between the device and the landmark using the first and second GPS coordinates; and convert the distance to a signal perceptible to a user.

Embodiments of the non-transitory computer readable storage medium include the following, alone or in any combination.

The instructions may further cause the controller to: determine the device's elevation based on pressure and temperature values received from the pressure sensor and the temperature sensor using an algorithm; obtain the landmark's elevation from the database; determine an elevation-compensated distance between the device and the landmark; and convert the elevation-compensated distance to a signal perceptible to the user.

The instructions may further cause the controller to determine the device's elevation based on pressure and temperature values received from the pressure sensor and the temperature sensor; and apply an elevation offset factor.

The instructions may further cause the controller to obtain a reference location from the database; determine that the device's location matches the reference location; determine the device's pressure elevation based on pressure and temperature values received from the pressure sensor and the temperature sensor; obtain a reference elevation from the database; compare the device's pressure elevation to the reference elevation; and determine the elevation offset factor such that the device's pressure elevation plus the elevation offset factor equals the reference elevation.

Shot information may comprise a slope compensated distance between the device and a landmark location and elevation.

Also provided is a method for determining distances executed by a controller on a device comprising a global positioning system (GPS) receiver, a pressure sensor and a temperature sensor in communication with the controller, the method comprising the controller determining the device's geographic location based on first coordinates from the GPS receiver; obtaining a landmark location based on second GPS coordinates from a database; determining a distance between the device and the landmark using the first and second GPS coordinates; and converting the distance to a signal perceptible to a user.

Embodiments of the method include the following, alone or in any combination.

The controller further determining the device's elevation based on pressure and temperature values received from the pressure sensor and the temperature sensor using an algorithm; obtaining the landmark's elevation from the database; determining an elevation-compensated distance between the device and the landmark; and converting the elevation-compensated distance to a signal perceptible to the user.

The controller determining the device's elevation based on pressure and temperature values received from the pressure sensor and the temperature sensor and applying an elevation offset factor.

The controller determines the elevation offset factor by obtaining a reference location from the database; determines that the device's location matches the reference location; determines the device's pressure elevation based on pressure and temperature values received from the pressure sensor and the temperature sensor; obtains a reference elevation from the database; compares the device's pressure elevation to the reference elevation; and determines the elevation offset factor such that the device's pressure elevation plus the elevation offset factor equals the reference elevation.

The method wherein shot information comprises a slope compensated distance between the device and a landmark location and elevation.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A device for determining distances, the device comprising:
   a controller, a global positioning system (GPS) receiver, a pressure sensor;
   a temperature sensor in communication with the controller;
   and a non-transitory computer readable storage medium comprising a plurality of computer readable instructions embodied thereon which, when executed by the controller, causes the controller to:
   determine the device's current geographic location based on current coordinates from the GPS receiver;
   obtain a landmark location based on the landmark's GPS coordinates from a database;
   determine a distance between the device and the landmark using the current GPS coordinates and the landmark's GPS coordinates;
   convert the distance from the device's current location and the landmark location to a signal perceptible to a user; and
   determine an elevation offset factor by executing computer readable instructions to:
   obtain a reference location based on GPS coordinates and a reference elevation from a database;
   determine whether the device's current location matches the reference location by comparing the reference GPS coordinates to the current GPS coordinates from the GPS receiver;
   determine the device's pressure elevation based on pressure and temperature values received from the pressure sensor and the temperature sensor;
   compare the device's pressure elevation to the reference elevation; and
   determine the elevation offset factor based on the difference between the device's pressure elevation and the reference elevation when the device's location matches the reference location.

2. The device according to claim 1 that is used to determine location and elevation information on a golf course.

3. The device according to claim 2 wherein the reference location is a tee box or a green.

4. The device according to claim 1 wherein the landmark is selected from the group consisting of green fronts, green centers, backs of greens, flagsticks, pin positions, cups, green perimeters, hazards, bunkers, traps, water features, roughs, fairway boundaries and cart paths.

5. The device according to claim 1 wherein the controller is further configured to determine the device's current elevation based on pressure and temperature values received from the pressure sensor and the temperature sensor and applying the elevation offset factor.

6. The device according to claim 5 wherein the device's current location and elevation is determined at a current lie of a golf ball on a golf course.

7. The device according to claim 5 wherein the controller is further configured to
obtain the landmark's elevation from the database;
determine shot information comprising a slope-compensated distance based on the landmark's location and elevation and the device's current location and elevation applied to a ballistic trajectory from the device's current location and elevation toward the landmark; and
convert the shot information to a signal perceptible to a user.

8. The device according to claim 7 wherein shot information further comprises an elevation-compensating factor to the slope-compensated distance based on the effect of the device's current elevation on ballistic flight of a golf ball.

9. The device according to claim 7 wherein shot information further comprises a temperature-compensating factor to the slope-compensated distance based on the effect of current temperature on ballistic flight of a golf ball.

10. The device according to claim 1 wherein the temperature sensor is remote from the device and temperature information is transmitted wirelessly to the controller.

11. A non-transitory computer readable storage medium comprising a plurality of computer readable instructions embodied thereon wherein the instructions, when executed by a controller of a device comprising a global positioning system (GPS) receiver, a pressure sensor;
and a temperature sensor in communication with the controller, causes the controller to:
determine the device's current location based on current GPS coordinates from the GPS receiver;
obtain a landmark location based on the landmark's GPS coordinates from a database;
determine a distance between the device and the landmark using the current GPS coordinates and the landmark's GPS coordinates;
convert the distance to a signal perceptible to a user; and
determine an elevation offset factor by executing computer readable instructions to:
obtain a reference location based on GPS coordinates and a reference elevation from a database;
determine whether the device's current location matches the reference location by comparing the reference GPS coordinates to the current GPS coordinates from the GPS receiver;
determine the device's pressure elevation based on pressure and temperature values received from the pressure sensor and the temperature sensor;
compare the device's pressure elevation to the reference elevation; and
determine the elevation offset factor based on the difference between the device's pressure and the reference elevation when the device's location matches the reference location.

12. The non-transitory computer readable storage medium according to claim 11 wherein the instructions further cause the controller to:
determine the device's elevation based on pressure and temperature values received from the pressure sensor and the temperature sensor; and
apply the elevation offset factor.

13. The non-transitory computer readable storage medium according to claim 12 wherein the instructions further cause the controller to:
obtain the landmark's elevation from the database;
determine shot information comprising a slope-compensated distance based on the landmark's location and elevation and the device's current location and elevation applied to a ballistic trajectory from the device's current location and elevation toward the landmark; and
convert the shot information to a signal perceptible to a user.

14. The non-transitory computer readable storage medium according to claim 13 wherein the instructions further cause the controller to determine an elevation-compensating factor based on the effect of the device's current elevation on ballistic flight of a golf ball and apply it to the slope-compensated distance.

15. The non-transitory computer readable storage medium according to claim 14 wherein the instructions further cause the controller to determine a temperature-compensating factor based on the effect of the current temperature on ballistic flight of a golf ball and apply it to the slope-compensated distance.

16. A method for determining distances executed by a controller on a device comprising a controller, a global positioning system (GPS) receiver, a pressure sensor; and a temperature sensor in communication with the controller, the method comprising the controller
determining the device's current location based on current GPS coordinates from the GPS receiver;
obtaining a landmark location based on the landmark's GPS coordinates from a database;
determining a distance between the device and the landmark using the current GPS coordinates and the landmark's GPS coordinates; and
converting the distance to a signal perceptible to a user; and
determining an elevation offset factor by executing computer readable instructions to:
obtain a reference location based on GPS coordinates and a reference elevation from a database;
determine whether the device's location matches the reference location by comparing the reference GPS coordinates to the current GPS coordinates from the GPS receiver;
determine the device's pressure elevation based on pressure and temperature values received from the pressure sensor and the temperature sensor;
compare the device's pressure elevation to the reference elevation; and
determine the elevation offset factor based on the difference between the device's pressure and the reference elevation when the device's location matches the reference location.

17. The method according to claim 16 further comprising the controller
determining the device's elevation based on pressure and temperature values received from the pressure sensor and the temperature sensor; and
applying the elevation offset factor.

18. The method according to claim 17 further comprising the controller obtaining the landmark's elevation from the database;

determining shot information comprising a slope-compensated distance based on the landmark's location and elevation and the device's current location and elevation applied to a ballistic trajectory from the device's current location and elevation toward the landmark; and converting the shot information to a signal perceptible to a user.

19. The method according to claim 18 further comprising the controller determining an elevation-compensating factor based on the effect of the current elevation on ballistic flight of a golf ball and applying it to the slope-compensated distance.

20. The method according to claim 18 further comprising the controller determining a temperature-compensating factor based on the effect of the current temperature on ballistic flight of a golf ball and applying it to the slope-compensated distance.

* * * * *